(12) United States Patent
Park et al.

(10) Patent No.: US 12,707,352 B2
(45) Date of Patent: Aug. 11, 2026

(54) APPARATUS AND METHOD FOR HANDOVER IN WIRELESS COMMUNICATION SYSTEM

(71) Applicant: LG ELECTRONICS INC., Seoul (KR)

(72) Inventors: Jae Yong Park, Seoul (KR); Sungjin Kim, Seoul (KR); Jaeky Oh, Seoul (KR); Jaehoon Chung, Seoul (KR); Sung Ryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 627 days.

(21) Appl. No.: 18/024,481

(22) PCT Filed: Jul. 19, 2021

(86) PCT No.: PCT/KR2021/009261
§ 371 (c)(1),
(2) Date: Mar. 2, 2023

(87) PCT Pub. No.: WO2022/050565
PCT Pub. Date: Mar. 10, 2022

(65) Prior Publication Data

US 2023/0319667 A1 Oct. 5, 2023

(30) Foreign Application Priority Data

Sep. 2, 2020 (KR) ........................ 10-2020-0111927

(51) Int. Cl.
*H04W 4/00* (2018.01)
*H04W 36/00* (2009.01)
(Continued)

(52) U.S. Cl.
CPC ................ *H04W 36/00837* (2018.08); *H04W 36/00692* (2023.05); *H04W 36/144* (2023.05); *H04W 36/249* (2023.05); *H04W 36/304* (2023.05)

(58) Field of Classification Search
USPC .......................................................... 370/331
See application file for complete search history.

(56) References Cited

U.S. PATENT DOCUMENTS 9,344,945 B2 * 5/2016 Da Silva ......... H04W 36/00837
9,385,799 B2 * 7/2016 Ko ...................... H04B 7/0632
(Continued)

FOREIGN PATENT DOCUMENTS

EP 3051877 8/2016
EP 4017108 6/2022
(Continued)

OTHER PUBLICATIONS

European Patent Office Application Serial No. 21864526.5 Search Report dated Aug. 27, 2024, 11 pages.
(Continued)

*Primary Examiner* — Amancio Gonzalez
(74) *Attorney, Agent, or Firm* — LEE, HONG, DEGERMAN, KANG & WAIMEY

(57) ABSTRACT

A method of operating a terminal and a base station in a wireless communication system and an apparatus supporting the same are disclosed. The method comprises receiving handover-related information from an access point (AP), the handover-related information including at least one first parameter for a handover learning model and quality of service (QoS) information; updating the first parameter to a second parameter through the handover learning model based on the QoS information; and performing handover based on the updated at least one second parameter.

15 Claims, 29 Drawing Sheets

(51) Int. Cl.

| | |
|---|---|
| ***H04W 36/14*** | (2009.01) |
| ***H04W 36/24*** | (2009.01) |
| ***H04W 36/30*** | (2009.01) |

(56) References Cited

U.S. PATENT DOCUMENTS

| | | | | |
|---|---|---|---|---|
| 9,420,512 | B2 * | 8/2016 | Kodali | H04W 52/146 |
| 10,397,836 | B2 * | 8/2019 | Park | H04W 36/0072 |
| 10,615,862 | B2 * | 4/2020 | Islam | H04L 5/0048 |
| 10,959,108 | B2 * | 3/2021 | Shekalim | H04W 16/18 |
| 11,122,480 | B2 * | 9/2021 | Anchan | G06F 16/9038 |
| 11,232,466 | B2 * | 1/2022 | Frank | G06Q 30/0203 |
| 11,356,888 | B2 * | 6/2022 | Li | H04W 40/24 |
| 11,646,492 | B2 * | 5/2023 | Tran | H01Q 1/44 343/721 |
| 11,653,258 | B2 * | 5/2023 | Stawiarski | H04W 28/0284 370/237 |
| 11,659,382 | B2 * | 5/2023 | Torvinen | H04W 12/106 726/1 |
| 11,716,659 | B2 * | 8/2023 | Akl | H04W 48/12 370/331 |
| 11,792,678 | B2 * | 10/2023 | Li | H04W 28/24 370/235 |
| 11,902,848 | B2 * | 2/2024 | Van Oost | H04W 28/0268 |
| 12,150,004 | B2 * | 11/2024 | Lu | H04W 36/0016 |
| 12,185,175 | B2 * | 12/2024 | Mwanje | H04W 36/0083 |
| 12,256,272 | B2 * | 3/2025 | Yajnanarayana | H04W 36/00835 |
| 12,301,668 | B2 * | 5/2025 | Sun | H04W 28/0236 |
| 2015/0011212 | A1 * | 1/2015 | Andrei | H04W 36/322 455/436 |
| 2016/0050589 | A1 * | 2/2016 | Safavi | H04W 36/0033 455/436 |
| 2017/0048780 | A1 * | 2/2017 | Qi | H04W 36/0061 |
| 2020/0059838 | A1 * | 2/2020 | Namba | H04W 88/06 |
| 2020/0162987 | A1 * | 5/2020 | Shimizu | H04W 28/22 |
| 2020/0296641 | A1 * | 9/2020 | Song | H04W 36/0085 |
| 2022/0335337 | A1 * | 10/2022 | Kovács | H04W 8/24 |

FOREIGN PATENT DOCUMENTS

| | | |
|---|---|---|
| KR | 1020170137082 | 12/2017 |
| WO | 2015174660 | 11/2015 |
| WO | 2016072893 | 5/2016 |
| WO | 2020064134 | 4/2020 |
| WO | 2021038863 | 3/2021 |

OTHER PUBLICATIONS

PCT International Application No. PCT/KR2021/009261, International Search Report dated Oct. 27, 2021, 5 pages.

Panasonic, "Discussion on the leaving conditions for Cho," 3GPP TSG-RAN WG2 Meeting #107bis, R2-1912693, Oct. 2019, 5 pages.

* cited by examiner

FIG. 2

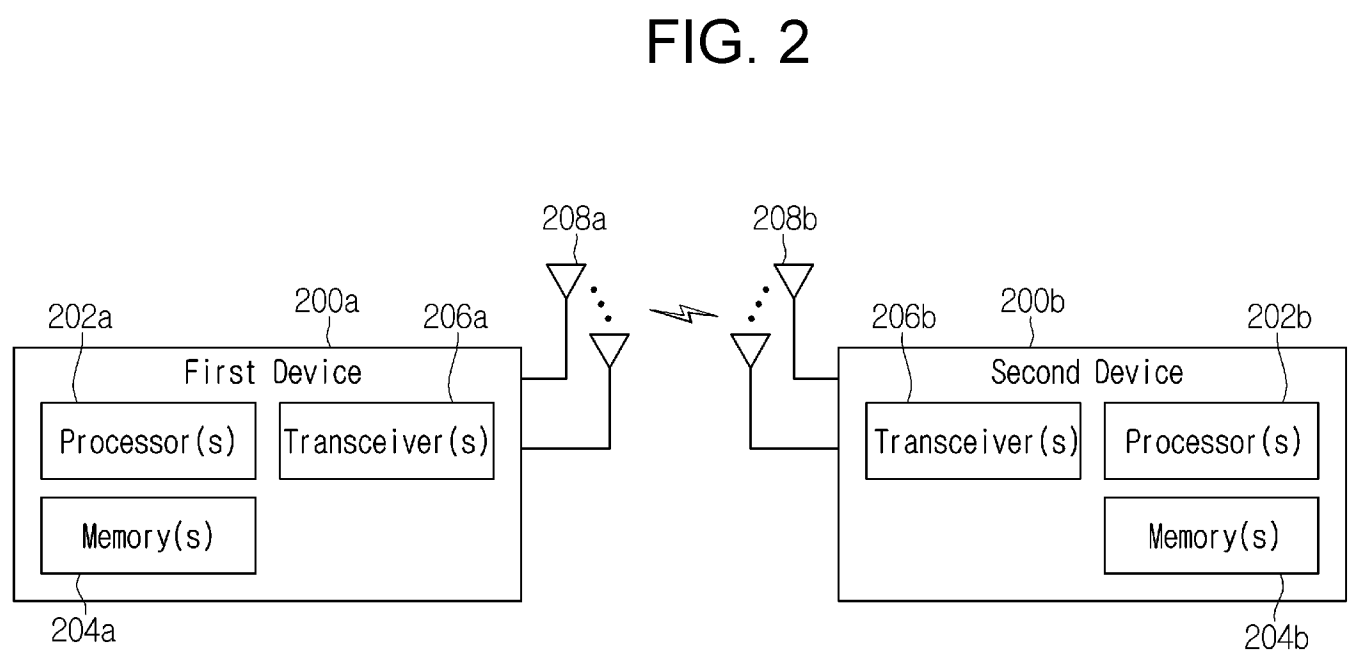

200a
First Device
202a
Processor(s)
204a
Memory(s)
206a
Transceiver(s)
208a 208b
200b
Second Device
202b
Processor(s)
204b
Memory(s)
206b
Transceiver(s)

FIG. 3

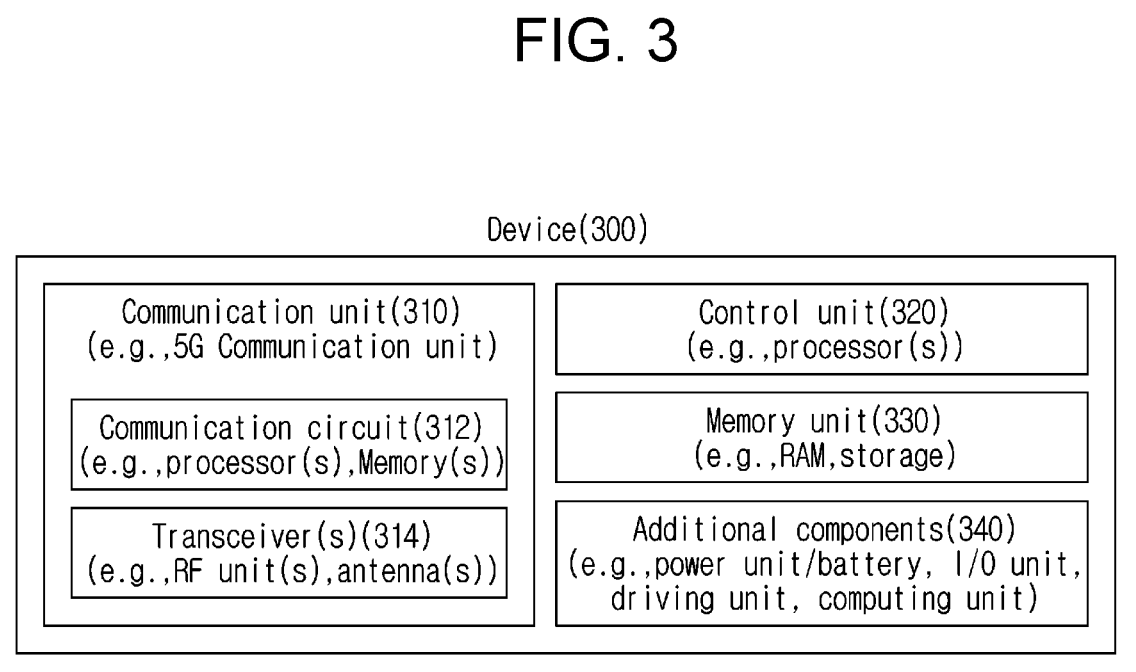

Device(300)

Communication unit(310)
(e.g.,5G Communication unit)

Communication circuit(312)
(e.g.,processor(s),Memory(s))

Transceiver(s)(314)
(e.g.,RF unit(s),antenna(s))

Control unit(320)
(e.g.,processor(s))

Memory unit(330)
(e.g.,RAM,storage)

Additional components(340)
(e.g.,power unit/battery, I/O unit, driving unit, computing unit)

FIG. 5

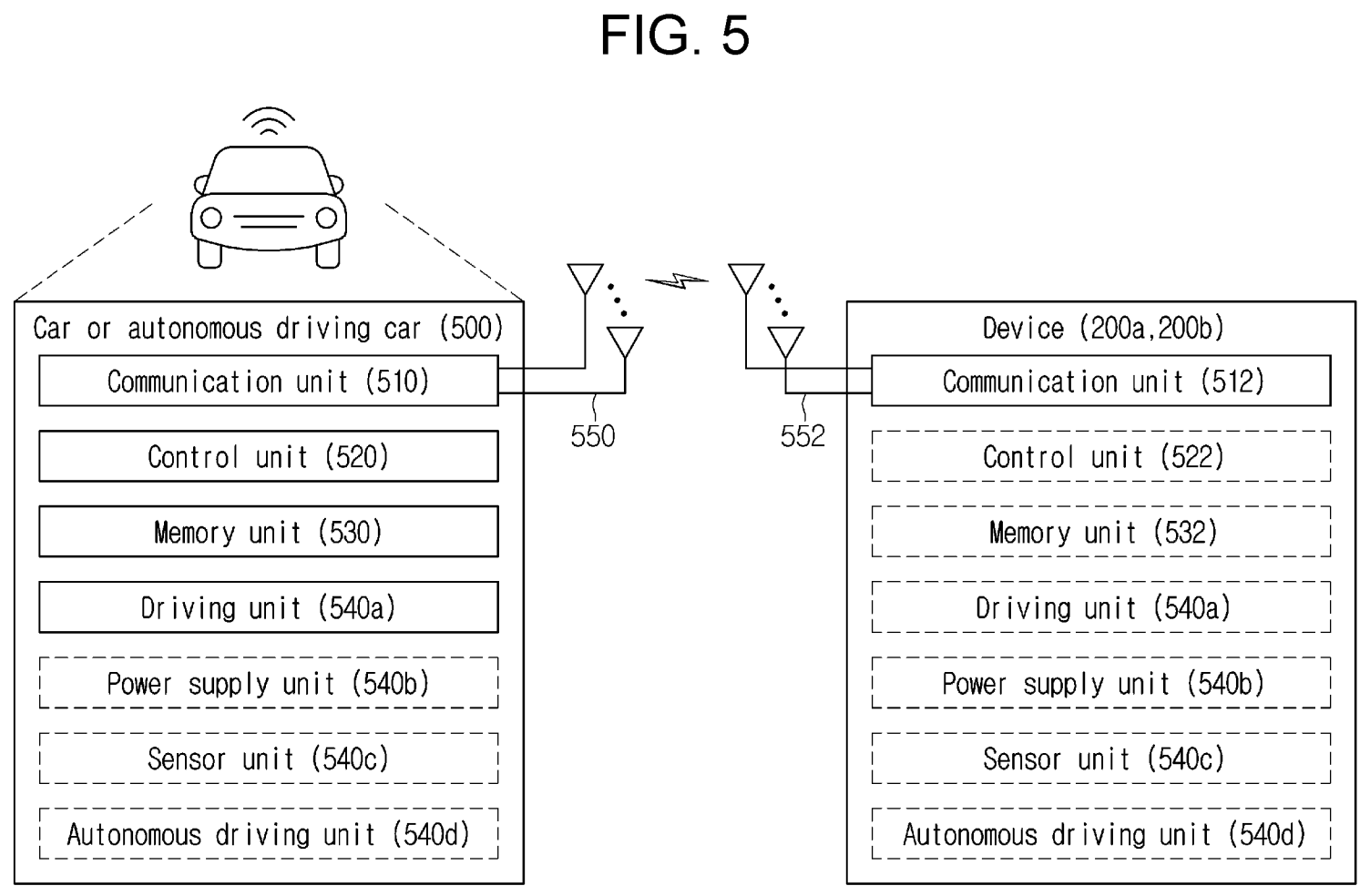

Car or autonomous driving car (500)
Communication unit (510)
Control unit (520)
Memory unit (530)
Driving unit (540a)
Power supply unit (540b)
Sensor unit (540c)
Autonomous driving unit (540d)

550

552

Device (200a,200b)
Communication unit (512)
Control unit (522)
Memory unit (532)
Driving unit (540a)
Power supply unit (540b)
Sensor unit (540c)
Autonomous driving unit (540d)

Figure 6:
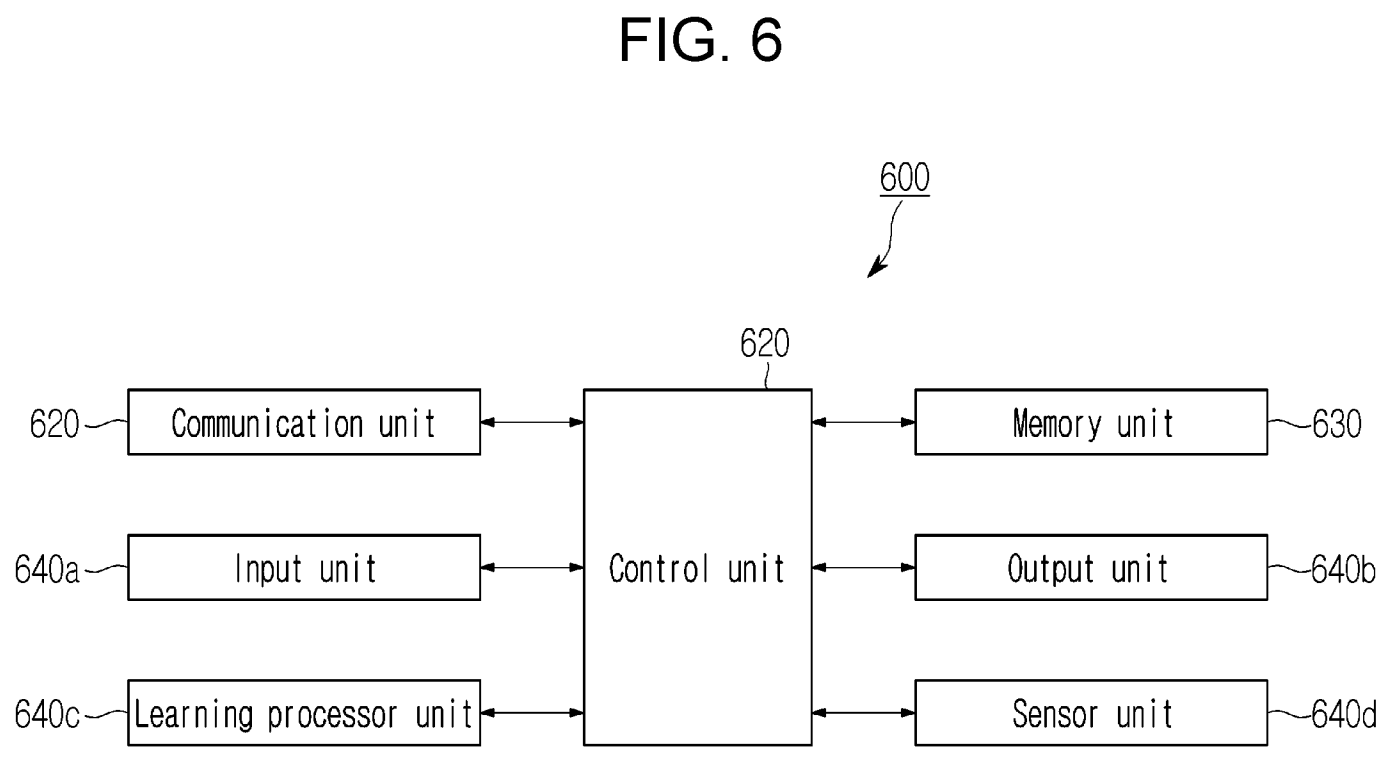

Communication unit 620
Input unit 640a
Learning processor unit 640c
Control unit 620
Memory unit 630
Output unit 640b
Sensor unit 640d

Figure 8:
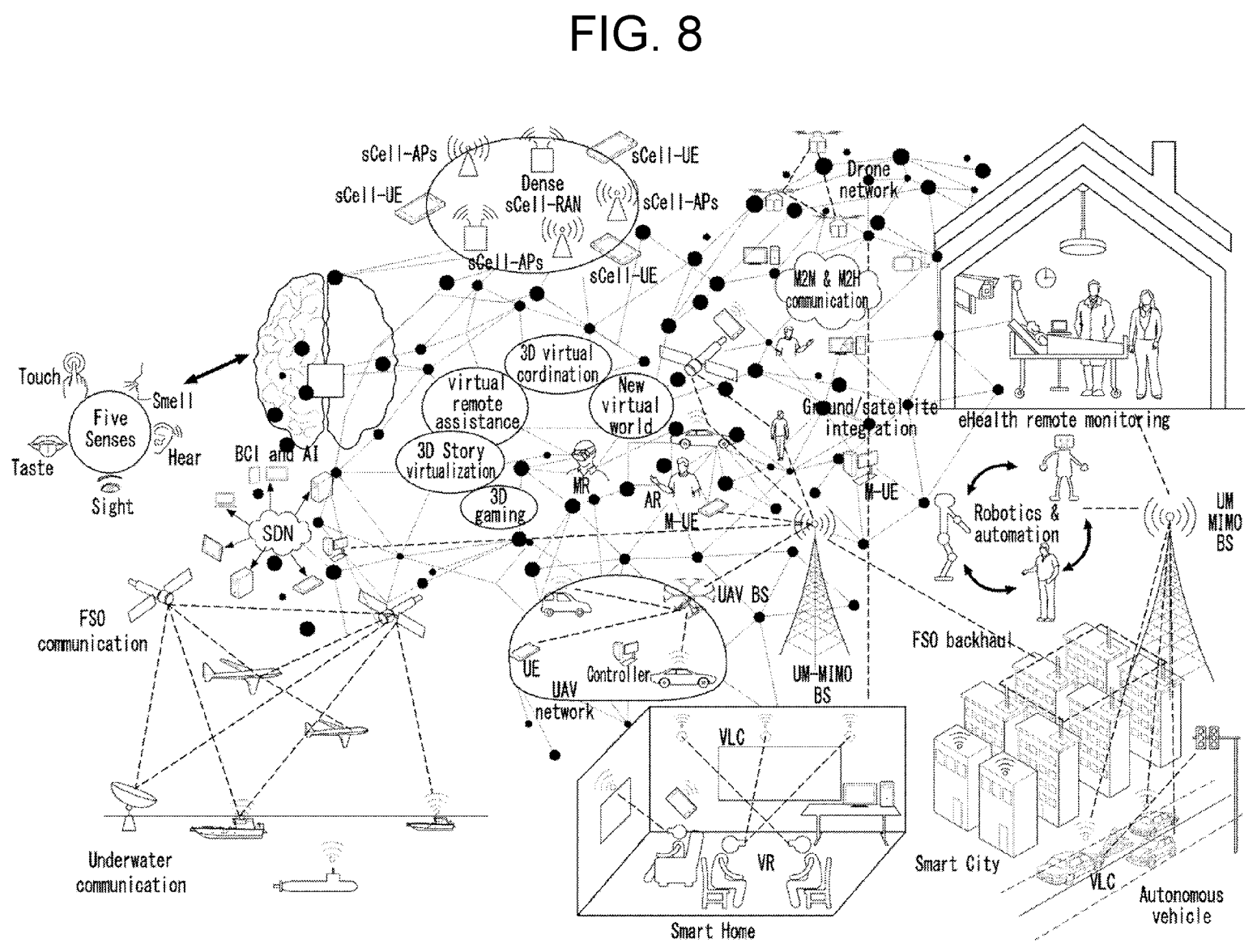

FIG. 8 eHealth remote monitoring
UM MIMO BS
Autonomous vehicle
VLC
Smart City
FSO backhaul
Robotics & automation
Drone network
Ground/satellite integration
M-UE
M2M & M2H communication
UM-MIMO BS
UAV BS
Smart Home
VLC
VR
sCell-UE
sCell-APs
Dense sCell-RAN
New virtual world
AR
MR
3D virtual cordination
virtual remote assistance
3D Story virtualization
3D gaming
Controller
UAV network
UE
BCI and AI
SDN
Five Senses
Smell
Hear
Sight
Touch
Taste
FSO communication
Underwater communication

APPARATUS AND METHOD FOR HANDOVER IN WIRELESS COMMUNICATION SYSTEM

CROSS-REFERENCE TO RELATED APPLICATION(S)

This application is the National Stage filing under 35 U.S.C. 371 of International Application No. PCT/KR2021/009261, filed on Jul. 19, 2021, which claims the benefit of earlier filing date and right of priority to Korean Application No. 10-2020-0111927, filed on Sep. 2, 2020, the contents of which are all incorporated by reference herein in their entirety.

TECHNICAL FIELD

The following description relates to a wireless communication system, and relates to a method and apparatus for handover in a wireless communication system.

BACKGROUND

Radio access systems have come into widespread in order to provide various types of communication services such as voice or data. In general, a radio access system is a multiple access system capable of supporting communication with multiple users by sharing available system resources (bandwidth, transmit power, etc.). Examples of the multiple access system include a code division multiple access (CDMA) system, a frequency division multiple access (FDMA) system, a time division multiple access (TDMA) system, a single carrier-frequency division multiple access (SC-FDMA) system, etc.

In particular, as many communication apparatuses require a large communication capacity, an enhanced mobile broadband (eMBB) communication technology has been proposed compared to radio access technology (RAT). In addition, not only massive machine type communications (MTC) for providing various services anytime anywhere by connecting a plurality of apparatuses and things but also communication systems considering services/user equipments (UEs) sensitive to reliability and latency have been proposed. To this end, various technical configurations have been proposed.

SUMMARY

The present disclosure relates to a method and apparatus for handover in a wireless communication system.

The technical objects to be achieved in the present disclosure are not limited to the above-mentioned technical objects, and other technical objects that are not mentioned may be considered by those skilled in the art through the embodiments described below.

As an example of the present disclosure, a method of operating a terminal in a wireless communication system may be disclosed. The terminal may receive handover-related information from an access point (AP). The handover-related information may include at least one first parameter for a handover learning model and quality of service (QoS) information. The terminal may update the first parameter to a second parameter through the handover learning model based on the QoS information. The terminal may perform handover based on the updated at least one second parameter. Here, the handover may change a connection from the AP to a base station. The terminal may transmit the second parameter to a base station. The handover-related information may include information indicating whether the terminal uses the handover learning model. The handover learning model may be a model trained based on a beta distribution, and the terminal may perform handover based on a randomly sampled value of the beta distribution and a bias value. The bias value may be a value for selecting a lower value from among sampled values, and a maximum value may be selected from among values obtained by adding the bias value to the sampled value. The terminal may check receive power and perform handover based on the maximum value.

As an example of the present disclosure, a terminal in a wireless communication system may be disclosed. The terminal may comprise a transceiver and a processor connected to the transceiver. The processor may control the transceiver to receive handover-related information from an access point (AP). The handover-related information may include at least one first parameter for a handover learning model and quality of service (QoS) information. The processor may update the first parameter to a second parameter through the handover learning model based on the QoS information and perform handover based on the updated at least one second parameter. The handover may change a connection from the AP to a base station. The processor may control the transceiver to transmit the second parameter to a base station. The handover-related information may include information indicating whether the terminal uses the handover learning model. The handover learning model may be a model trained based on a beta distribution, and the processor may perform handover based on a randomly sampled value of the beta distribution and a bias value. The bias value may be a value for selecting a lower value from among sampled values, and a maximum value may be selected from among values obtained by the bias value to the sampled value. The processor may check receive power and perform handover based on the maximum value.

As an example of the present disclosure, an apparatus comprising at least one memory and at least one processor functionally connected to the at least one memory may be disclosed. The at least one processor may control the apparatus to receive handover-related information from an access point (AP). The handover-related information may include at least one first parameter for a handover learning model and quality of service (QoS) information. The at least one processor may control the apparatus to update the first parameter to a second parameter through the handover learning model based on the QoS information. The at least one processor may control the apparatus to perform handover based on the updated at least one second parameter.

As an example of the present disclosure, a non-transitory computer-readable medium storing at least one instruction may be disclosed. The non-transitory computer-readable medium may comprise at least one instruction executable by a processor. The at least one instruction may instruct the computer-readable medium to receive handover-related information from an access point (AP). The handover-related information may include at least one first parameter for a handover learning model and quality of service (QoS) information.

The at least one instruction may instruct the computer-readable medium to update the first parameter to a second parameter through the handover learning model based on the QoS information.

The at least one instruction may instruct the computer-readable medium to perform handover based on the updated at least one second parameter.

The above-described aspects of the present disclosure are only a part of the preferred embodiments of the present disclosure, and various embodiments reflecting technical features of the present disclosure may be derived and understood by those skilled in the art on the basis of the detailed description of the present disclosure provided below.

The following effects may be produced by embodiments based on the present disclosure.

According to the present disclosure, a terminal may perform efficient handover between Wi-Fi and a base station.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

FIG. 2 is a view showing an example of a wireless device applicable to the present disclosure.

FIG. 3 is a view showing another example of a wireless device applicable to the present disclosure.

FIG. 5 is a view showing an example of a car or an autonomous driving car applicable to the present disclosure.

FIG. 6 is a view showing an example of artificial intelligence (AI) applicable to the present disclosure.

FIG. 8 is a view showing an example of a communication structure providable in a 6th generation (6G) system applicable to the present disclosure.

DETAILED DESCRIPTION

Figure 1:
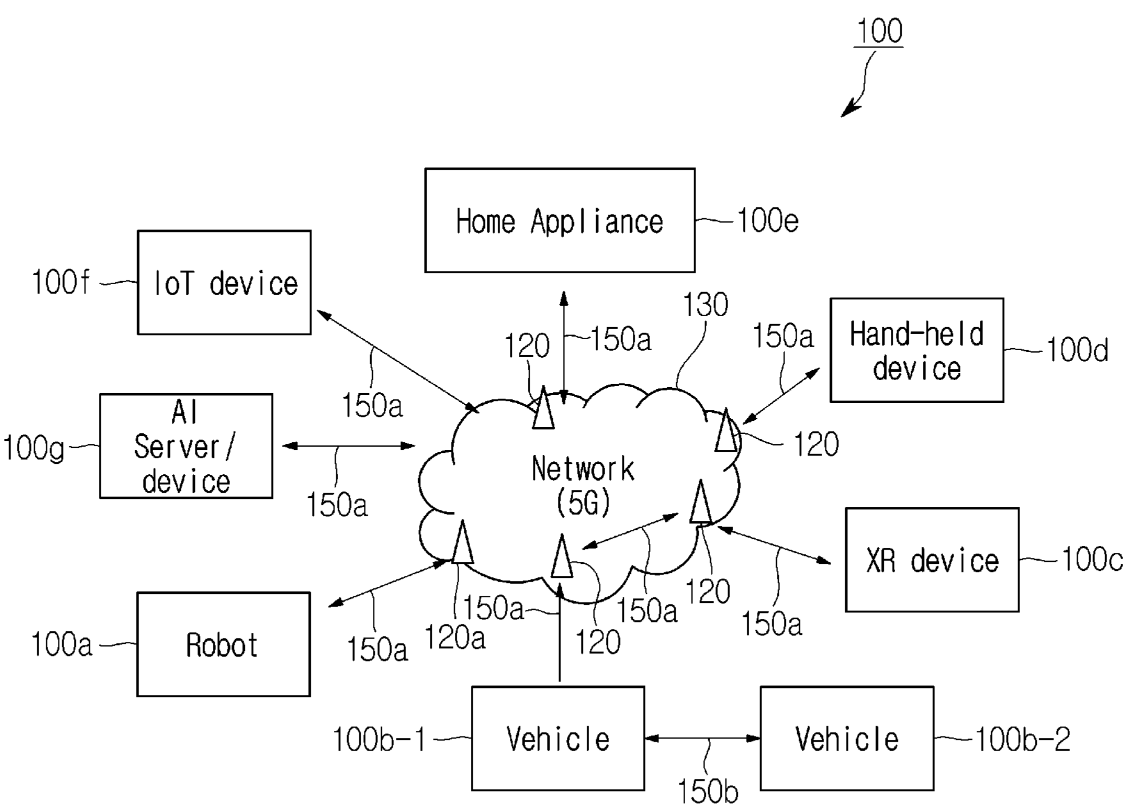
FIG. 1 is a view showing an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a mobile station. ABS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an uplink (UL). Likewise, the mobile station may serve as a receiver and the BS may serve as a transmitter, on a downlink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5th generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as code division multiple access (CDMA), frequency division multiple access (FDMA), time division multiple access (TDMA), orthogonal frequency division multiple access (OFDMA), single carrier frequency division multiple access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a view showing an example of a communication system applicable to the present disclosure.

Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100*a*, vehicles 100*b*-1 and 100*b*-2, an extended reality (XR) device 100*c*, a hand-held device 100*d*, a home appliance 100*e*, an Internet of Thing (IoT) device 100*f*, and an artificial intelligence (AI) device/server 100*g*. For example, the vehicles may include a vehicle having a wireless communication function, an autonomous vehicle, a vehicle capable of performing vehicle-to-vehicle communication, etc. The vehicles 100*b*-1 and 100*b*-2 may include an unmanned aerial vehicle (UAV) (e.g., a drone). The XR device 100*c* includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100*d* may include a smartphone, a smart pad, a wearable device (e.g., a smart watch or smart glasses), a computer (e.g., a laptop), etc. The home appliance 100*e* may include a TV, a refrigerator, a washing machine, etc. The IoT device 100*f* may include a sensor, a smart meter, etc. For example, the base station 120 and the network 130 may be implemented by a wireless device, and a specific wireless device 120*a* may operate as a base station/network node for another wireless device.

The wireless devices 100*a* to 100*f* may be connected to the network 130 through the base station 120. AI technology is applicable to the wireless devices 100*a* to 100*f*, and the wireless devices 100*a* to 100*f* may be connected to the AI server 100*g* through the network 130. The network 130 may be configured using a 3G network, a 4G (e.g., LTE) network or a 5G (e.g., NR) network, etc. The wireless devices 100*a* to 100*f* may communicate with each other through the base station 120/the network 130 or perform direct communication (e.g., sidelink communication) without through the base station 120/the network 130. For example, the vehicles 100*b*-1 and 100*b*-2 may perform direct communication (e.g., vehicle to vehicle (V2V)/vehicle to everything (V2X) communication). In addition, the IoT device 100*f* (e.g., a sensor) may perform direct communication with another IoT device (e.g., a sensor) or the other wireless devices 100*a* to 100*f*.

Wireless communications/connections 150*a*, 150*b* and 150*c* may be established between the wireless devices 100*a* to 100*f*/the base station 120 and the base station 120/the base station 120. Here, wireless communication/connection may be established through various radio access technologies (e.g., 5G NR) such as uplink/downlink communication 150*a*, sidelink communication 150*b* (or D2D communication) or communication 150*c* between base stations (e.g., relay, integrated access backhaul (IAB). The wireless device and the base station/wireless device or the base station and the base station may transmit/receive radio signals to/from each other through wireless communication/connection 150*a*, 150*b* and 150*c*. For example, wireless communication/connection 150*a*, 150*b* and 150*c* may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Wireless Device Applicable to the Present Disclosure

FIG. 2 is a view showing an example of a wireless device applicable to the present disclosure.

Referring to FIG. 2, a first wireless device 200*a* and a second wireless device 200*b* may transmit and receive radio signals through various radio access technologies (e.g., LTE or NR). Here, {the first wireless device 200*a*, the second wireless device 200*b*} may correspond to {the wireless device 100*x*, the base station 120} and/or {the wireless device 100*x*, the wireless device 100*x*} of FIG. 1.

The first wireless device 200*a* may include one or more processors 202*a* and one or more memories 204*a* and may further include one or more transceivers 206*a* and/or one or more antennas 208*a*. The processor 202*a* may be configured to control the memory 204*a* and/or the transceiver 206*a* and to implement descriptions, functions, procedures, proposals, methods and/or operational flowcharts disclosed herein. For example, the processor 202*a* may process information in the memory 204*a* to generate first information/signal and then transmit a radio signal including the first information/signal through the transceiver 206*a*. In addition, the processor 202*a* may receive a radio signal including second information/signal through the transceiver 206*a* and then store information obtained from signal processing of the second information/signal in the memory 204*a*. The memory 204*a* may be coupled with the processor 202*a*, and store a variety of information related to operation of the processor 202*a*. For example, the memory 204*a* may store software code including instructions for performing all or some of the processes controlled by the processor 202*a* or performing the descriptions, functions, procedures, proposals, methods and/or operational flowcharts disclosed herein. Here, the processor 202*a* and the memory 204*a* may be part of a communication modem/circuit/chip designed to implement wireless communication technology (e.g., LTE or NR). The transceiver 206*a* may be coupled with the processor 202*a* to transmit and/or receive radio signals through one or more antennas 208*a*. The transceiver 206*a* may include a transmitter and/or a receiver. The transceiver 206*a* may be used interchangeably with a radio frequency (RF) unit. In the present disclosure, the wireless device may refer to a communication modem/circuit/chip.

The second wireless device 200*b* may include one or more processors 202*b* and one or more memories 204*b* and may further include one or more transceivers 206*b* and/or one or more antennas 208*b*. The processor 202*b* may be configured to control the memory 204*b* and/or the transceiver 206*b* and to implement the descriptions, functions, procedures, proposals, methods and/or operational flowcharts disclosed herein. For example, the processor 202*b* may process information in the memory 204*b* to generate third information/signal and then transmit the third information/signal through the transceiver 206*b*. In addition, the processor 202*b* may receive a radio signal including fourth information/signal through the transceiver 206*b* and then store information obtained from signal processing of the fourth information/signal in the memory 204*b*. The memory 204*b* may be coupled with the processor 202*b* to store a variety of information related to operation of the processor 202*b*. For example, the memory 204*b* may store software code including instructions for performing all or some of the processes controlled by the processor 202*b* or performing the descriptions, functions, procedures, proposals, methods and/or operational flowcharts disclosed herein. Herein, the processor 202*b* and the memory 204*b* may be part of a communication modem/circuit/chip designed to implement wireless communication technology (e.g., LTE or NR). The transceiver 206*b* may be coupled with the processor 202*b* to transmit and/or receive radio signals through one or more antennas 208*b*. The transceiver 206*b* may include a transmitter and/or a receiver. The transceiver 206*b* may be used interchangeably with a radio frequency (RF) unit. In the present disclosure, the wireless device may refer to a communication modem/circuit/chip.

Hereinafter, hardware elements of the wireless devices 200*a* and 200*b* will be described in greater detail. Without being limited thereto, one or more protocol layers may be implemented by one or more processors 202*a* and 202*b*. For example, one or more processors 202*a* and 202*b* may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202*a* and 202*b* may generate one or more protocol data units (PDUs) and/or one or more service data unit (SDU) according to the descriptions, functions, procedures, proposals, methods and/or operational flowcharts disclosed herein. One or more processors 202*a* and 202*b* may generate messages, control information, data or information according to the descriptions, functions, procedures, proposals, methods and/or operational flowcharts disclosed herein. One or more processors 202*a* and 202*b* may generate PDUs, SDUs, messages, control information, data or information according to the functions, procedures, proposals and/or methods disclosed herein and provide the PDUs, SDUs, messages, control information, data or information to one or more transceivers 206*a* and 206*b*. One or more processors 202*a* and 202*b* may receive signals (e.g., baseband signals) from one or more transceivers 206*a* and 206*b* and acquire PDUs, SDUs, messages, control information, data or information according to the descriptions, functions, procedures, proposals, methods and/or operational flowcharts disclosed herein.

One or more processors 202*a* and 202*b* may be referred to as controllers, microcontrollers, microprocessors or microcomputers. One or more processors 202*a* and 202*b* may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202*a* and 202*b*. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202*a* and 202*b* or stored in one or more memories 204*a* and 204*b* to be driven by one or more processors 202*a* and 202*b*. The descriptions, functions, procedures, proposals, methods and/or operational flowcharts disclosed herein implemented using firmware or software in the form of code, a command and/or a set of commands.

One or more memories 204*a* and 204*b* may be coupled with one or more processors 202*a* and 202*b* to store various types of data, signals, messages, information, programs, code, instructions and/or commands. One or more memories 204*a* and 204*b* may be composed of read only memories (ROMs), random access memories (RAMs), erasable programmable read only memories (EPROMs), flash memories, hard drives, registers, cache memories, computer-readable storage mediums and/or combinations thereof. One or more memories 204*a* and 204*b* may be located inside and/or outside one or more processors 202*a* and 202*b*. In addition, one or more memories 204*a* and 204*b* may be coupled with one or more processors 202*a* and 202*b* through various technologies such as wired or wireless connection.

One or more transceivers 206*a* and 206*b* may transmit user data, control information, radio signals/channels, etc. described in the methods and/or operational flowcharts of the present disclosure to one or more other apparatuses. One or more transceivers 206*a* and 206*b* may receive user data, control information, radio signals/channels, etc. described in the methods and/or operational flowcharts of the present disclosure from one or more other apparatuses. For example, one or more transceivers 206*a* and 206*b* may be coupled with one or more processors 202*a* and 202*b* to transmit/receive radio signals. For example, one or more processors 202*a* and 202*b* may perform control such that one or more transceivers 206*a* and 206*b* transmit user data, control information or radio signals to one or more other apparatuses. In addition, one or more processors 202*a* and 202*b* may perform control such that one or more transceivers 206*a* and 206*b* receive user data, control information or radio signals from one or more other apparatuses. In addition, one or more transceivers 206*a* and 206*b* may be coupled with one or more antennas 208*a* and 208*b*, and one or more transceivers 206*a* and 206*b* may be configured to transmit/receive user data, control information, radio signals/channels, etc. described in the descriptions, functions, procedures, proposals, methods and/or operational flowcharts disclosed herein through one or more antennas 208*a* and 208*b*. In the present disclosure, one or more antennas may be a plurality of physical antennas or a plurality of logical antennas (e.g., antenna ports). One or more transceivers 206*a* and 206*b* may convert the received radio signals/channels, etc. from RF band signals to baseband signals, in order to process the received user data, control information, radio signals/channels, etc. using one or more processors 202*a* and 202*b*. One or more transceivers 206*a* and 206*b* may convert the user data, control information, radio signals/channels processed using one or more processors 202*a* and 202*b* from baseband signals into RF band signals. To this end, one or more transceivers 206*a* and 206*b* may include (analog) oscillator and/or filters.

Structure of Wireless Device Applicable to the Present Disclosure

FIG. 3 is a view showing another example of a wireless device applicable to the present disclosure.

Referring to FIG. 3, a wireless device 300 may correspond to the wireless devices 200*a* and 200*b* of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202*a* and 202*b* and/or one or more memories 204*a* and 204*b* of FIG. 2. For example, the transceiver(s) 314 may include one or more transceivers 206*a* and 206*b* and/or one or more antennas 208*a* and 208*b* of FIG. 2. The control unit 320 may be electrically coupled with the communication unit 310, the memory unit 330 and the additional components 340 to control overall operation of the wireless device. For example, the control unit 320 may control electrical/mechanical operation of the wireless device based on a program/code/instruction/information stored in the memory unit 330. In addition, the control unit 320 may transmit the information stored in the memory unit 330 to the outside (e.g., another communication device) through the wireless/wired interface using the communication unit 310 over a wireless/wired interface or store information received from the outside (e.g., another communication device) through the wireless/wired interface using the communication unit 310 in the memory unit 330.

The additional components 340 may be variously configured according to the types of the wireless devices. For example, the additional components 340 may include at least one of a power unit/battery, an input/output unit, a driving unit or a computing unit. Without being limited thereto, the wireless device 300 may be implemented in the form of the robot (FIG. 1, 100*a*), the vehicles (FIGS. 1, 100*b*-1 and 100*b*-2), the XR device (FIG. 1, 100*c*), the hand-held device (FIG. 1, 100*d*), the home appliance (FIG. 1, 100*e*), the IoT device (FIG. 1, 1000, a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 3, various elements, components, units/portions and/or modules in the wireless device 300 may be coupled with each other through wired interfaces or at least some thereof may be wirelessly coupled through the communication unit 310. For example, in the wireless device 300, the control unit 320 and the communication unit 310 may be coupled by wire, and the control unit 320 and the first unit (e.g., 130 or 140) may be wirelessly coupled through the communication unit 310. In addition, each element, component, unit/portion and/or module of the wireless device 300 may further include one or more elements. For example, the control unit 320 may be composed of a set of one or more processors. For example, the control unit 320 may be composed of a set of a communication control processor, an application processor, an electronic control unit (ECU), a graphic processing processor, a memory control processor, etc. In another example, the memory unit 330 may be composed of a random access memory (RAM), a dynamic RAM (DRAM), a read only memory (ROM), a flash memory, a volatile memory, a non-volatile memory and/or a combination thereof Hand-Held Device Applicable to the Present Disclosure FIG. 4 is a view showing an example of a hand-held device applicable to the present disclosure.

Figure 4:
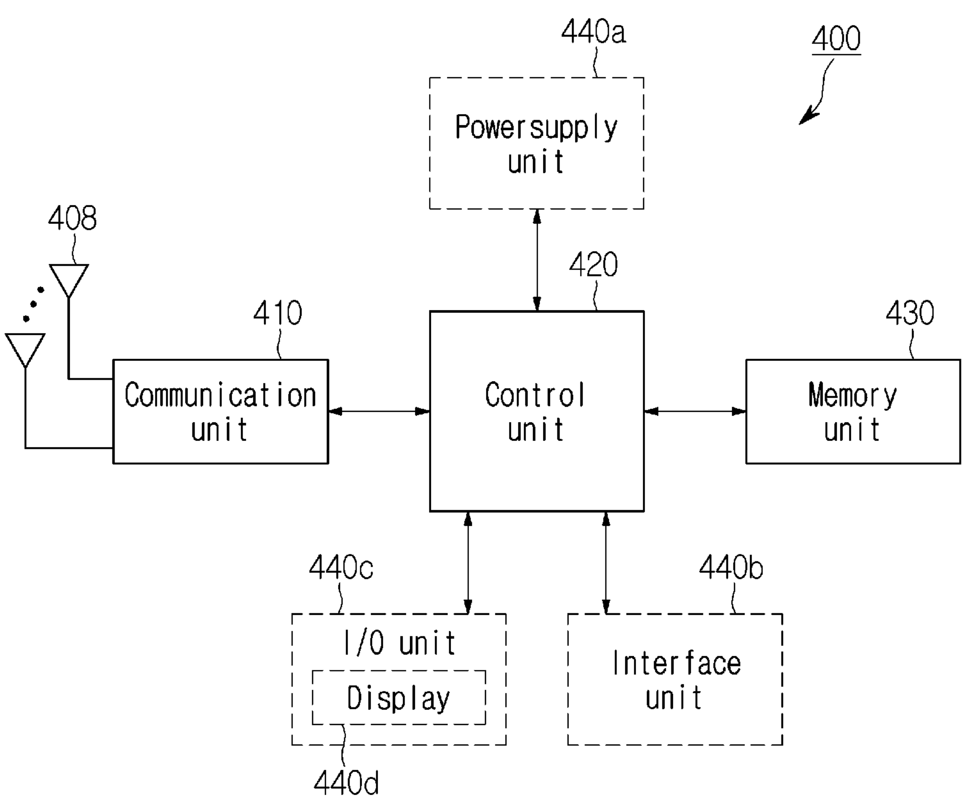
FIG. 4 is a view showing an example of a hand-held device applicable to the present disclosure.

FIG. 4 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 4, the hand-held device 400 may include an antenna unit (antenna) 408, a communication unit (transceiver) 410, a control unit (controller) 420, a memory unit (memory) 430, a power supply unit (power supply) 440*a*, an interface unit (interface) 440*b*, and an input/output unit 440*c*. An antenna unit (antenna) 408 may be part of the communication unit 410. The blocks 410 to 430/440*a* to 440*c* may correspond to the blocks 310 to 330/340 of FIG. 3, respectively.

The communication unit 410 may transmit and receive signals (e.g., data, control signals, etc.) to and from other wireless devices or base stations. The control unit 420 may control the components of the hand-held device 400 to perform various operations. The control unit 420 may include an application processor (AP). The memory unit 430 may store data/parameters/program/code/instructions necessary to drive the hand-held device 400. In addition, the memory unit 430 may store input/output data/information, etc. The power supply unit 440*a* may supply power to the hand-held device 400 and include a wired/wireless charging circuit, a battery, etc. The interface unit 440*b* may support connection between the hand-held device 400 and another external device. The interface unit 440*b* may include various ports (e.g., an audio input/output port and a video input/output port) for connection with the external device. The input/output unit 440*c* may receive or output video information/signals, audio information/signals, data and/or user input information. The input/output unit 440*c* may include a camera, a microphone, a user input unit, a display 440*d*, a speaker and/or a haptic module.

For example, in case of data communication, the input/output unit 440*c* may acquire user input information/signal (e.g., touch, text, voice, image or video) from the user and store the user input information/signal in the memory unit 430. The communication unit 410 may convert the information/signal stored in the memory into a radio signal and transmit the converted radio signal to another wireless device directly or transmit the converted radio signal to a base station. In addition, the communication unit 410 may receive a radio signal from another wireless device or the base station and then restore the received radio signal into original information/signal. The restored information/signal may be stored in the memory unit 430 and then output through the input/output unit 440*c* in various forms (e.g., text, voice, image, video and haptic).

Type of Wireless Device Applicable to the Present Disclosure

FIG. 5 is a view showing an example of a car or an autonomous driving car applicable to the present disclosure.

FIG. 5 shows a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited.

Referring to FIG. 5, the car or autonomous driving car 500 may include an antenna unit (antenna) 508, a communication unit (transceiver) 510, a control unit (controller) 520, a driving unit 540*a*, a power supply unit (power supply) 540*b*, a sensor unit 540*c*, and an autonomous driving unit 540*d*. The antenna unit 550 may be configured as part of the communication unit 510. The blocks 510/530/540*a* to 540*d* correspond to the blocks 410/430/440 of FIG. 4.

The communication unit 510 may transmit and receive signals (e.g., data, control signals, etc.) to and from external devices such as another vehicle, a base station (e.g., a base station, a road side unit, etc.), and a server. The control unit 520 may control the elements of the car or autonomous driving car 500 to perform various operations. The control unit 520 may include an electronic control unit (ECU).

FIG. 6 is a view showing an example of artificial intelligence (AI) device applicable to the present disclosure. For example, the AI device may be implemented as fixed or movable devices such as a TV, a projector, a smartphone, a PC, a laptop, a digital broadcast terminal, a tablet PC, a wearable device, a set-top box (STB), a radio, a washing machine, a refrigerator, a digital signage, a robot, a vehicle, or the like.

Referring to FIG. 6, the AI device 600 may include a communication unit (transceiver) 610, a control unit (controller) 620, a memory unit (memory) 630, an input/output unit 640*a*/640*b*, a leaning processor unit (learning processor) 640*c* and a sensor unit 640*d*. The blocks 610 to 630/640*a* to 640*d* may correspond to the blocks 310 to 330/340 of FIG. 3, respectively.

The communication unit 610 may transmit and receive wired/wireless signals (e.g., sensor information, user input, learning models, control signals, etc.) to and from external devices such as another AI device (e.g., FIG. 1, 100*x*, 120 or 140) or the AI server (FIG. 1, 140) using wired/wireless communication technology. To this end, the communication unit 610 may transmit information in the memory unit 630 to an external device or transfer a signal received from the external device to the memory unit 630.

The control unit 620 may determine at least one executable operation of the AI device 600 based on information determined or generated using a data analysis algorithm or a machine learning algorithm. In addition, the control unit 620 may control the components of the AI device 600 to perform the determined operation. For example, the control unit 620 may request, search for, receive or utilize the data of the learning processor unit 640*c* or the memory unit 630, and control the components of the AI device 600 to perform predicted operation or operation, which is determined to be desirable, of at least one executable operation. In addition, the control unit 620 may collect history information including operation of the AI device 600 or user's feedback on the operation and store the history information in the memory unit 630 or the learning processor unit 640*c* or transmit the history information to the AI server (FIG. 1, 140). The collected history information may be used to update a learning model.

The memory unit 630 may store data supporting various functions of the AI device 600. For example, the memory unit 630 may store data obtained from the input unit 640*a*, data obtained from the communication unit 610, output data of the learning processor unit 640*c*, and data obtained from the sensing unit 640. In addition, the memory unit 630 may store control information and/or software code necessary to operate/execute the control unit 620.

The input unit 640*a* may acquire various types of data from the outside of the AI device 600. For example, the input unit 640*a* may acquire learning data for model learning, input data, to which the learning model will be applied, etc. The input unit 640*a* may include a camera, a microphone and/or a user input unit. The output unit 640*b* may generate video, audio or tactile output. The output unit 640*b* may include a display, a speaker and/or a haptic module. The sensing unit 640 may obtain at least one of internal information of the AI device 600, the surrounding environment information of the AI device 600 and user information using various sensors. The sensing unit 640 may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar.

The learning processor unit 640*c* may train a model composed of an artificial neural network using training data. The learning processor unit 640*c* may perform AI processing along with the learning processor unit of the AI server (FIG. 1, 140). The learning processor unit 640*c* may process information received from an external device through the communication unit 610 and/or information stored in the memory unit 630. In addition, the output value of the learning processor unit 640*c* may be transmitted to the external device through the communication unit 610 and/or stored in the memory unit 630.

Figure 7:
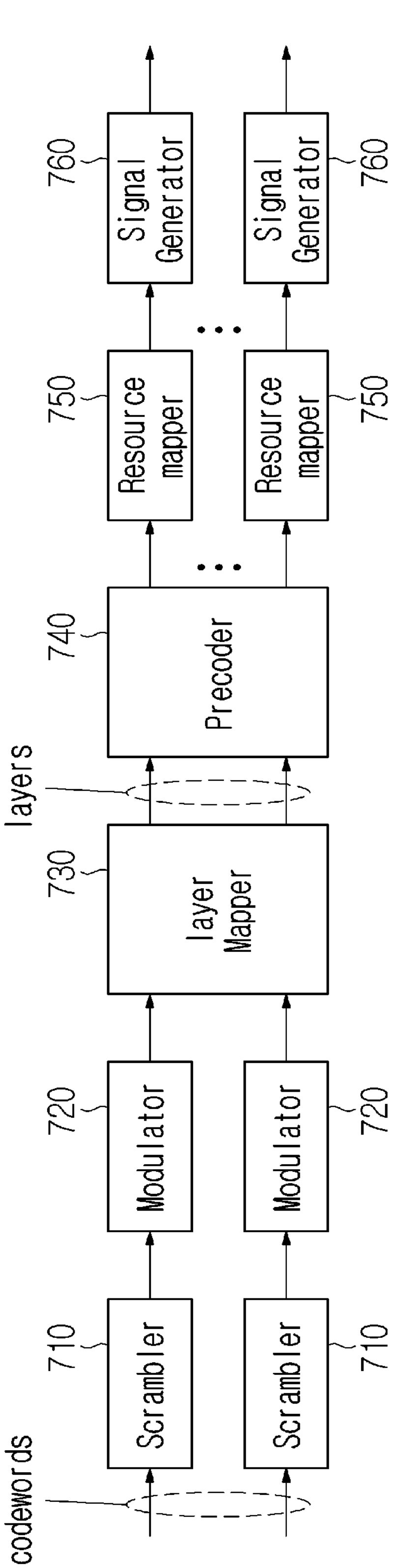
FIG. 7 is a view showing a method of processing a transmitted signal applicable to the present disclosure.

FIG. 7 is a view showing a method of processing a transmitted signal applicable to the present disclosure. For example, the transmitted signal may be processed by a signal processing circuit. At this time, a signal processing circuit 700 may include a scrambler 710, a modulator 720, a layer mapper 730, a precoder 740, a resource mapper 750, and a signal generator 760. At this time, for example, the operation/function of FIG. 7 may be performed by the processors 202*a* and 202*b* and/or the transceiver 206*a* and 206*b* of FIG. 2. In addition, for example, the hardware element of FIG. 7 may be implemented in the processors 202*a* and 202*b* of FIG. 2 and/or the transceivers 206*a* and 206*b* of FIG. 2. For example, blocks 1010 to 1060 may be implemented in the processors 202*a* and 202*b* of FIG. 2. In addition, blocks 710 to 750 may be implemented in the processors 202*a* and 202*b* of FIG. 2 and a block 760 may be implemented in the transceivers 206*a* and 206*b* of FIG. 2, without being limited to the above-described embodiments.

A codeword may be converted into a radio signal through the signal processing circuit 700 of FIG. 7. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 10.

Specifically, the codeword may be converted into a bit sequence scrambled by the scrambler 710. The scramble sequence used for scramble is generated based in an initial value and the initial value may include ID information of a wireless device, etc. The scrambled bit sequence may be modulated into a modulated symbol sequence by the modulator 720. The modulation method may include pi/2-binary phase shift keying (pi/2-BPSK), m-phase shift keying (m-PSK), m-quadrature amplitude modulation (m-QAM), etc.

A complex modulation symbol sequence may be mapped to one or more transport layer by the layer mapper 730. Modulation symbols of each transport layer may be mapped to corresponding antenna port(s) by the precoder 740 (precoding). The output z of the precoder 740 may be obtained by multiplying the output y of the layer mapper 730 by an N*M precoding matrix W. Here, N may be the number of antenna ports and M may be the number of transport layers. Here, the precoder 740 may perform precoding after transform precoding (e.g., discrete Fourier transform (DFT)) for complex modulation symbols. In addition, the precoder 740 may perform precoding without performing transform precoding.

The resource mapper 750 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 760 may generate a radio signal from the mapped modulation symbols, and the generated radio signal may be transmitted to another device through each antenna. To this end, the signal generator 760 may include an inverse fast Fourier transform (IFFT) module, a cyclic prefix (CP) insertor, a digital-to-analog converter (DAC), a frequency uplink converter, etc.

A signal processing procedure for a received signal in the wireless device may be configured as the inverse of the signal processing procedures 710 to 760 of FIG. 7. For example, the wireless device (e.g., 200*a* or 200*b* of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 1 below. That is, Table 1 shows the requirements of the 6G system.

TABLE 1

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

FIG. 8 is a view showing an example of a communication structure providable in a 6G system applicable to the present disclosure.

Referring to FIG. 8, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system.

Core Implementation Technology of 6G System

Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to build a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

Terahertz (THz) Communication

THz communication is applicable to the 6G system. For example, a data rate may increase by increasing bandwidth. This may be performed by using sub-THz communication with wide bandwidth and applying advanced massive MIMO technology.

Figure 9:
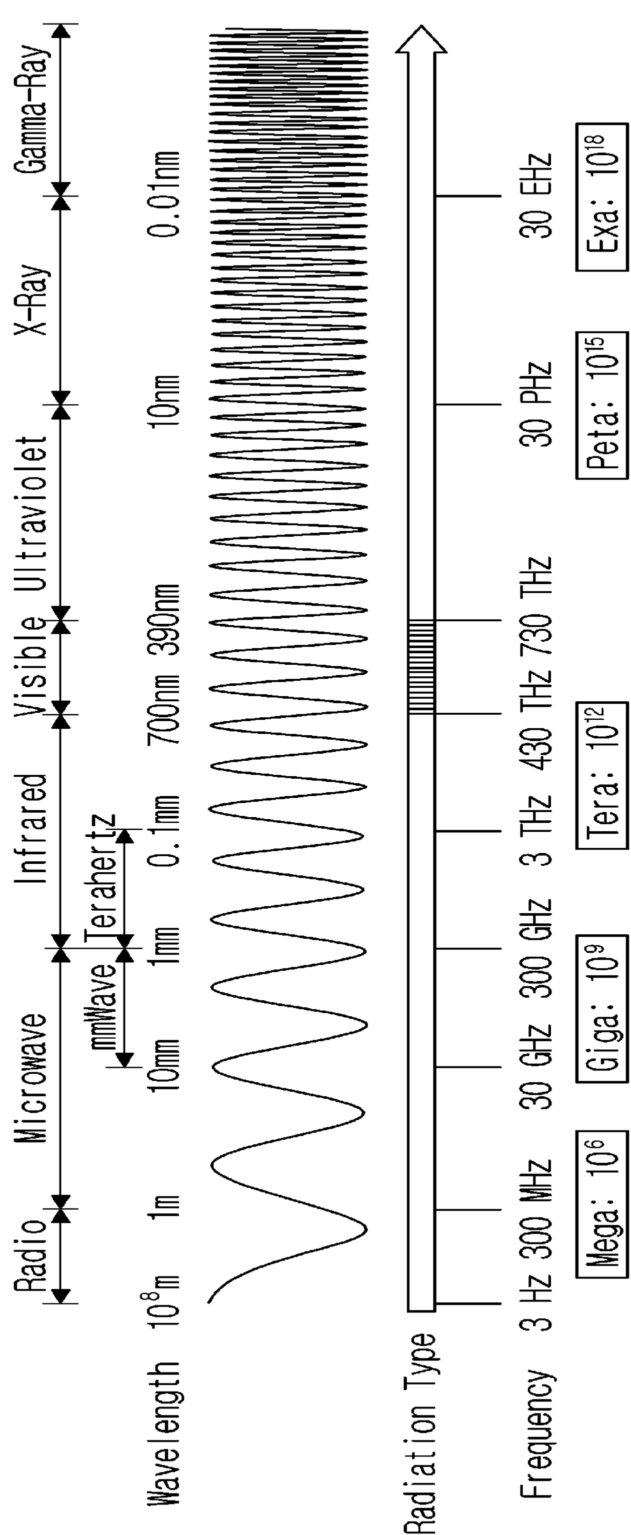
FIG. 9 is a view showing an electromagnetic spectrum applicable to the present disclosure.

FIG. 9 is a view showing an electromagnetic spectrum applicable to the present disclosure. For example, referring to FIG. 9, THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high path loss occurring at a high frequency (a high directional antenna is indispensable). A narrow beam width generated by the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

THz Wireless Communication

Figure 10:
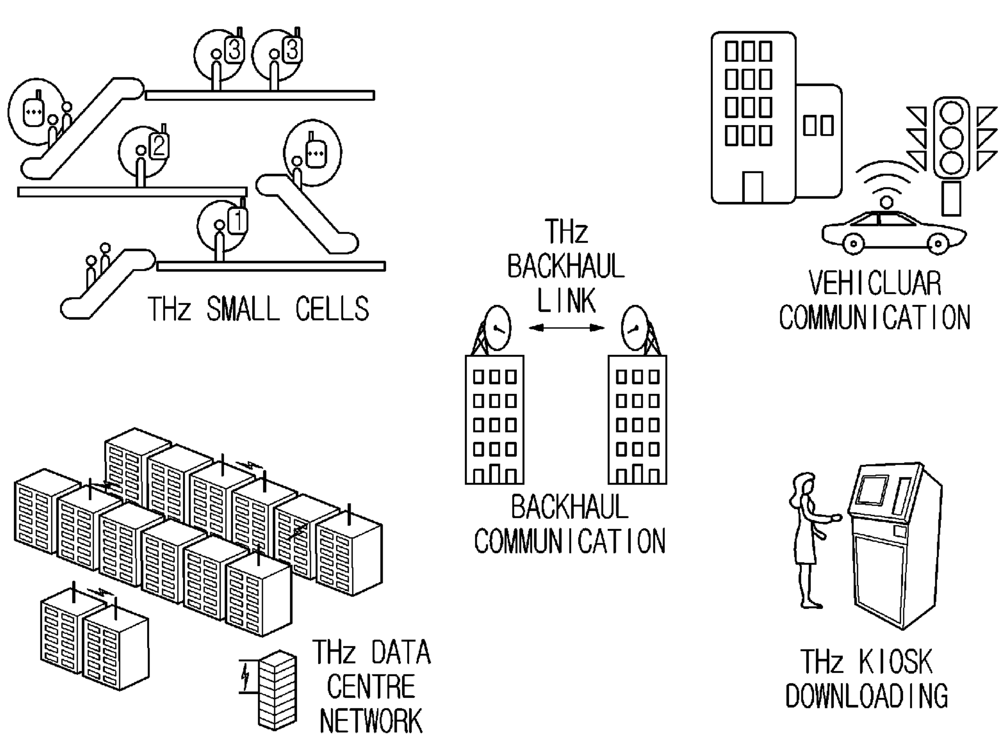
FIG. 10 is a view showing a THz communication method applicable to the present disclosure.

FIG. 10 is a view showing a THz communication method applicable to the present disclosure.

Referring to FIG. 10, THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence.

Artificial Intelligence System

Figure 11:
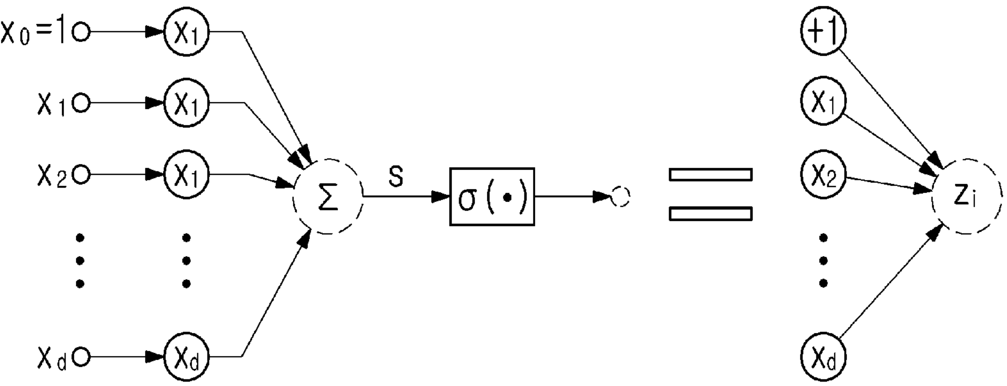
FIG. 11 is a view showing a perceptron architecture in an artificial neural network applicable to the present disclosure.
Figure 12:
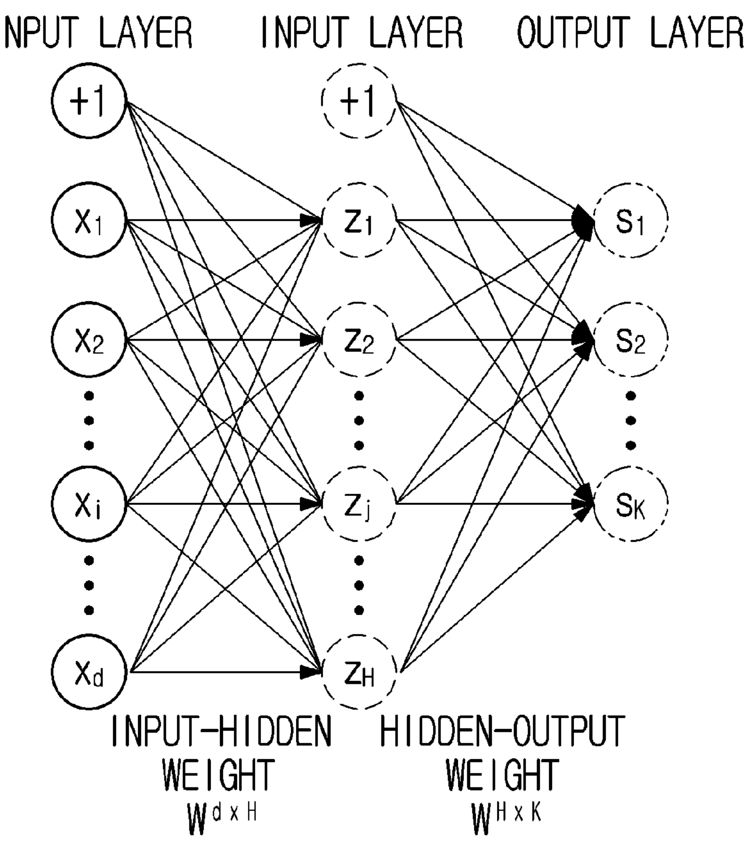
FIG. 12 is a view showing an artificial neural network architecture applicable to the present disclosure.

FIG. 11 is a view showing a perceptron architecture in an artificial neural network applicable to the present disclosure. In addition, FIG. 12 is a view showing an artificial neural network architecture applicable to the present disclosure.

As described above, an artificial intelligence system may be applied to a 6G system. Herein, as an example, the artificial intelligence system may operate based on a learning model corresponding to the human brain, as described above. Herein, a paradigm of machine learning, which uses a neural network architecture with high complexity like artificial neural network, may be referred to as deep learning. In addition, neural network cores, which are used as a learning scheme, are mainly a deep neural network (DNN), a convolutional deep neural network (CNN), and a recurrent neural network (RNN). Herein, as an example referring to FIG. 23, an artificial neural network may consist of a plurality of perceptrons. Herein, when an input vector $x=\{x_1, x_2, \ldots, x_d\}$ is input, each component is multiplied by a weight $\{W_1, W_2, \ldots, W_d\}$, results are all added up, and then an activation function 60 is applied, of which the overall process may be referred to as a perceptron. For a large artificial neural network architecture, when expanding the simplified perceptron structure illustrated in FIG. 23, an input may be applied to different multidimensional perceptrons. For convenience of explanation, an input value or an output value will be referred to as a node.

Figure 23:
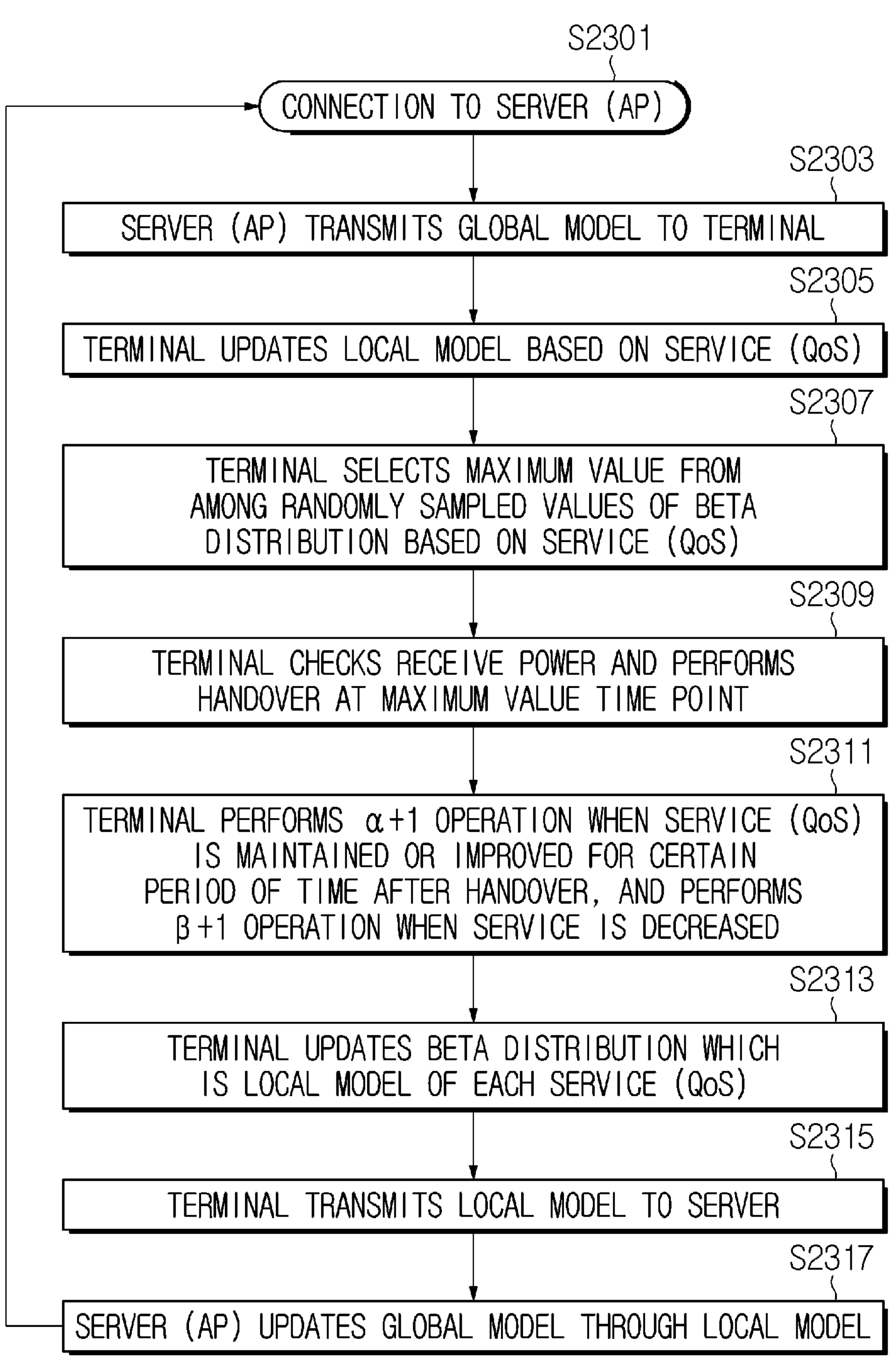
FIG. 23 is a diagram illustrating an example of an operation procedure of a terminal applicable to the present disclosure.

Meanwhile, the perceptron structure illustrated in FIG. 23 may be described to consist of a total of 3 layers based on an input value and an output value. An artificial neural network, which has H (d+1)-dimensional perceptrons between a 1st layer and a 2nd layer and K (H+1)-dimensional perceptrons between the 2nd layer and a 3rd layer, may be expressed as in FIG. 24.

Herein, a layer, in which an input vector is located, is referred to as an input layer, a layer, in which a final output value is located, is referred to as an output layer, and all the layers between the input layer and the output layer are referred to as hidden layers. As an example, 3 layers are disclosed in FIG. 24, but since an input layer is excluding in counting the number of actual artificial neural network layers, it can be understood that the artificial neural network illustrated in FIG. 23 has a total of 2 layers. An artificial neural network is constructed by connecting perceptrons of a basic block two-dimensionally.

The above-described input layer, hidden layer and output layer are commonly applicable not only to multilayer perceptrons but also to various artificial neural network architectures like CNN and RNN, which will be described below. As there are more hidden layers, an artificial neural network becomes deeper, and a machine learning paradigm using a sufficiently deep artificial neural network as a learning model may be referred to as deep learning. In addition, an artificial neural network used for deep learning may be referred to as a deep neural network (DNN).

Figure 13:
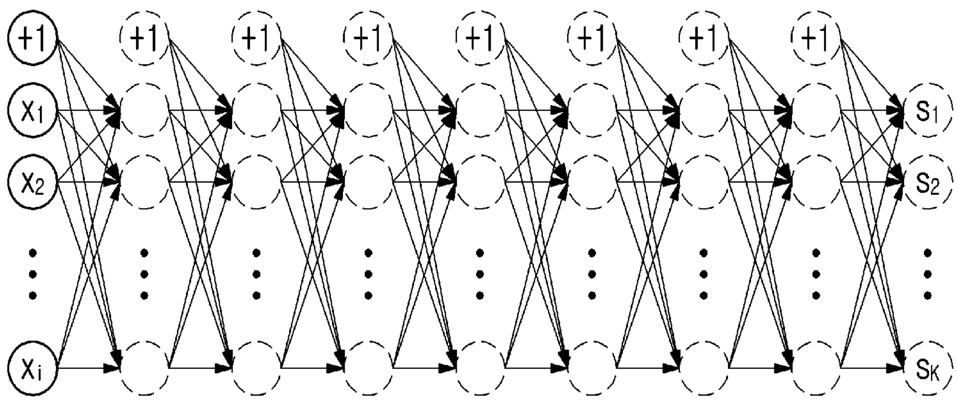
FIG. 13 is a view showing a deep neural network applicable to the present disclosure.

FIG. 13 is a view showing a deep neural network applicable to the present disclosure.

Referring to FIG. 13, a deep neural network may be a multilayer perceptron consisting of 8 layers (hidden layers+ output layer). Herein, the multilayer perceptron structure may be expressed as a fully-connected neural network. In a fully-connected neural network, there may be no connection between nodes in a same layer and only nodes located in neighboring layers may be connected with each other. A DNN has a fully-connected neural network structure combining a plurality of hidden layers and activation functions so that it may be effectively applied for identifying a correlation characteristic between an input and an output. Herein, the correlation characteristic may mean a joint probability between the input and the output.

Figure 14:
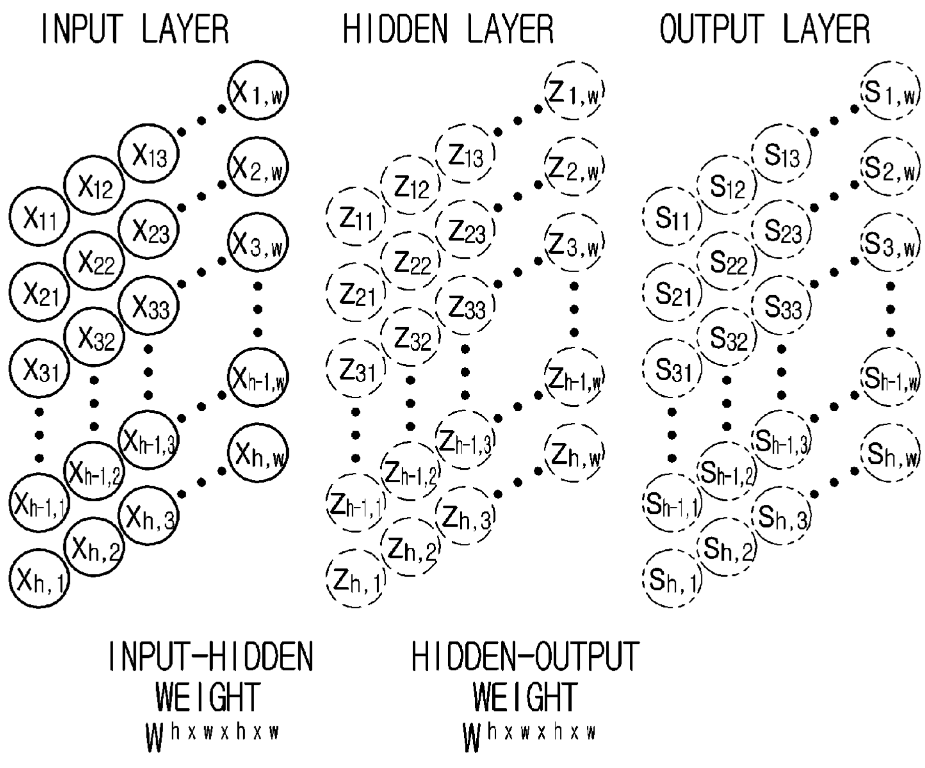
FIG. 14 is a view showing a convolutional neural network applicable to the present disclosure.
Figure 15:
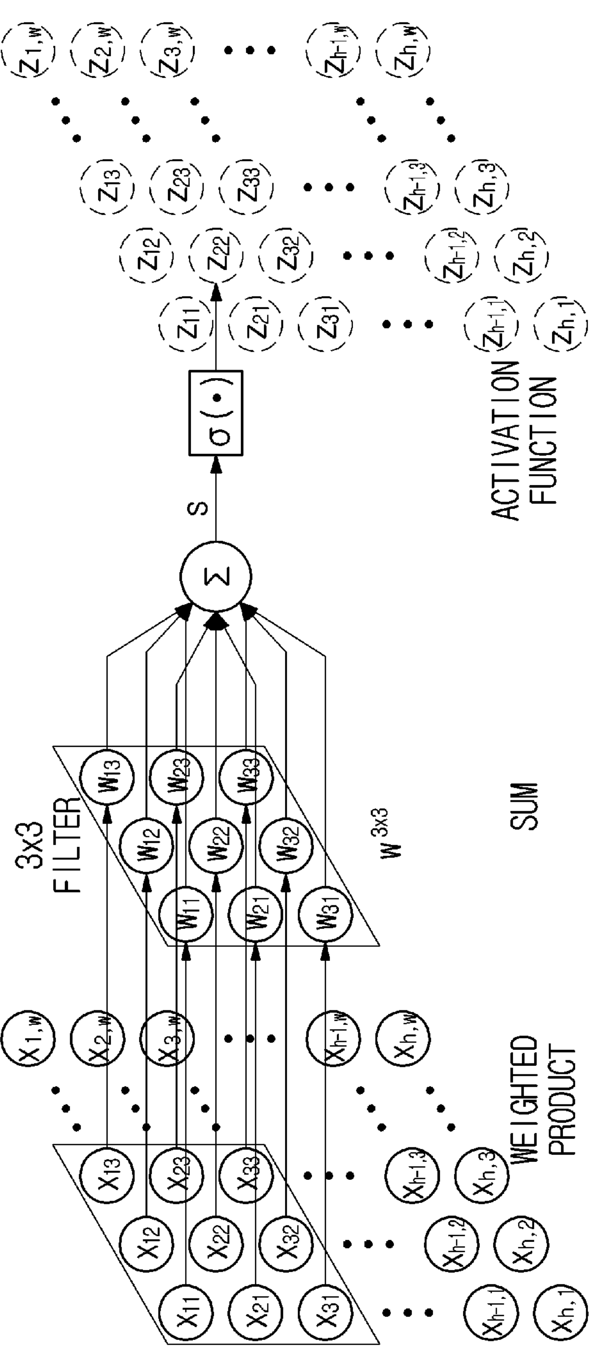
FIG. 15 is a view showing a filter operation of a convolutional neural network applicable to the present disclosure.

FIG. 14 is a view showing a convolutional neural network applicable to the present disclosure. In addition, FIG. 15 is a view showing a filter operation of a convolutional neural network applicable to the present disclosure.

As an example, depending on how to connect a plurality of perceptrons, it is possible to form various artificial neural network structures different from the above-described DNN. Herein, in the DNN, nodes located in a single layer are arranged in a one-dimensional vertical direction. However, referring to FIG. 14, it is possible to assume a two-dimensional array of w horizontal nodes and h vertical nodes (the convolutional neural network structures of FIG. 14). In this case, since a weight is applied to each connection in a process of connecting one input node to a hidden layer, a total of h×w weights should be considered. As there are h×w nodes in an input layer, a total of $h^2w^2$ weights may be needed between two neighboring layers.

Furthermore, as the convolutional neural network of FIG. 14 has the problem of exponential increase in the number of weights according to the number of connections, the presence of a small filter may be assumed instead of considering every mode of connections between neighboring layers. As an example, as shown in FIG. 15, weighted summation and activation function operation may be enabled for a portion overlapped by a filter.

At this time, one filter has a weight corresponding to a number as large as its size, and learning of a weight may be performed to extract and output a specific feature on an image as a factor. In FIG. 15, a 3×3 filter may be applied to a top rightmost 3×3 area of an input layer, and an output value, which is a result of the weighted summation and activation function operation for a corresponding node, may be stored at $z_{22}$.

Herein, as the above-described filter scans the input layer while moving at a predetermined interval horizontally and vertically, a corresponding output value may be put a position of a current filter. Since a computation method is similar to a convolution computation for an image in the field of computer vision, such a structure of deep neural network may be referred to as a convolutional neural network (CNN), and a hidden layer created as a result of convolution computation may be referred to as a convolutional layer. In addition, a neural network with a plurality of convolutional layers may be referred to as a deep convolutional neural network (DCNN).

In addition, at a node in which a current filter is located in a convolutional layer, a weighted sum is calculated by including only a node in an area covered by the filter and thus the number of weights may be reduced. Accordingly, one filter may be so used as to focus on a feature of a local area. Thus, a CNN may be effectively applied to image data processing for which a physical distance in a two-dimensional area is a crucial criterion of determination. Meanwhile, a CNN may apply a plurality of filters immediately before a convolutional layer and create a plurality of output results through a convolution computation of each filter.

Meanwhile, depending on data properties, there may be data of which a sequence feature is important. A recurrent neural network structure may be a structure obtained by applying a scheme, in which elements in a data sequence are input one by one at each timestep by considering the distance variability and order of such sequence datasets and an output vector (hidden vector) output at a specific timestep is input with a very next element in the sequence, to an artificial neural network.

Figure 16:
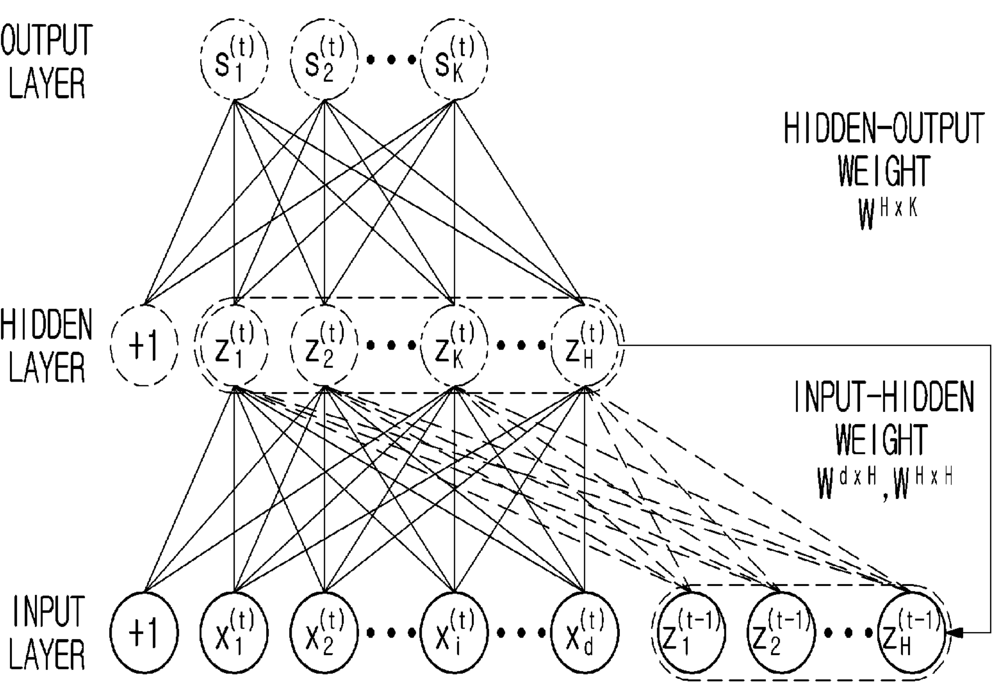
FIG. 16 is a view showing a neural network architecture with a recurrent loop applicable to the present disclosure.

FIG. 16 is a view showing a neural network architecture with a recurrent loop applicable to the present disclosure.

Figure 17:
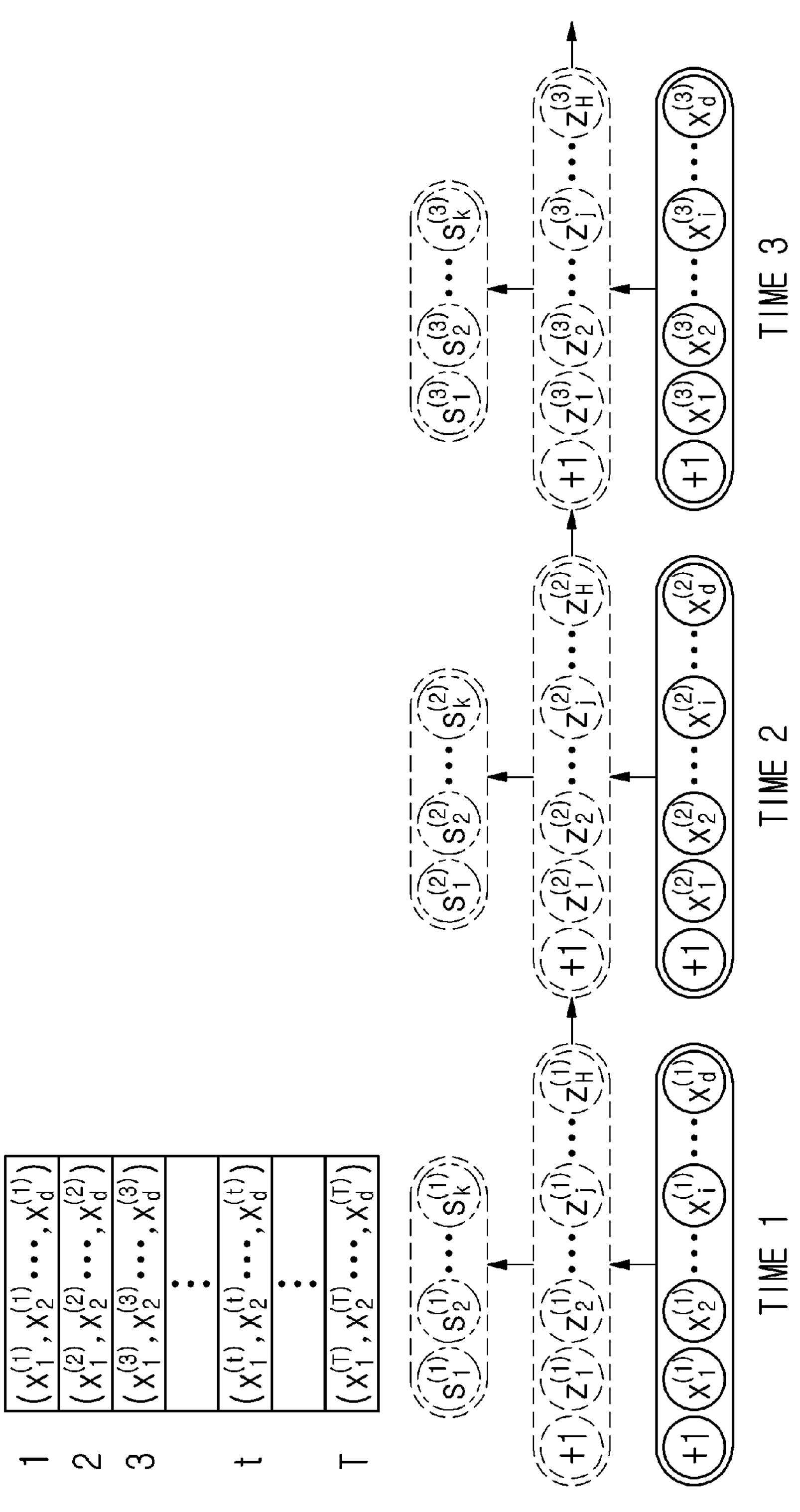
FIG. 17 is a view showing an operational structure of a recurrent neural network applicable to the present disclosure.

FIG. 17 is a view showing an operational structure of a recurrent neural network applicable to the present disclosure.

Referring to FIG. 16, a recurrent neural network (RNN) may have a structure which applies a weighted sum and an activation function by inputting hidden vectors $\{z_1^{(t-1)}, z_2^{(t-1)}, \ldots, z_H^{(t-1)}\}$ of an immediately previous timestep t−1 during a process of inputting elements $\{x_1^{(t)}, x_2^{(t)}, \ldots, x_d^{(t)}\}$ of a timestep t in a data sequence into a fully connected neural network. The reason why such hidden vectors are forwarded to a next timestep is because information in input vectors at previous timesteps is considered to have been accumulated in a hidden vector of a current timestep.

In addition, referring to FIG. 17, a recurrent neural network may operate in a predetermined timestep order for an input data sequence. Herein, as a hidden vector $\{z_1^{(1)}, z_2^{(1)}, \ldots, z_H^{(1)}\}$ at a time of inputting an input vector $\{x_1^{(t)}, x_2^{(t)}, \ldots, x_d^{(t)}\}$ of timestep 1 into a recurrent neural network is input together with an input vector $\{x_1^{(2)}, x_2^{(2)}, \ldots, x_d^{(2)}\}$ of timestep 2, a vector $\{z_1^{(2)}, z_2^{(2)}, \ldots, z_H^{(2)}\}$ of a hidden layer is determined through a weighted sum and an activation function. Such a process is iteratively performed at timestep 2, timestep 3 and until timestep T.

Meanwhile, when a plurality of hidden layers are allocated in a recurrent neural network, this is referred to as a deep recurrent neural network (DRNN). A recurrent neural network is so designed as to effectively apply to sequence data (e.g., natural language processing).

Apart from DNN, CNN and RNN, other neural network cores used as a learning scheme include various deep learning techniques like restricted Boltzmann machine (RBM), deep belief networks (DBN) and deep Q-Network, and these may be applied to such areas as computer vision, voice recognition, natural language processing, and voice/signal processing.

Recently, there are attempts to integrate AI with a wireless communication system, but these are concentrated in an application layer and a network layer and, especially in the case of deep learning, in a wireless resource management and allocation filed. Nevertheless, such a study gradually evolves to an MAC layer and a physical layer, and there are attempts to combine deep learning and wireless transmission especially in a physical layer. As for a fundamental signal processing and communication mechanism, AI-based physical layer transmission means application of a signal processing and communication mechanism based on an AI driver, instead of a traditional communication framework. For example, it may include deep learning-based channel coding and decoding, deep learning-based signal estimation and detection, deep learning-based MIMO mechanism, and AI-based resource scheduling and allocation.

Specific Embodiment of the Present Disclosure

Figure 18:
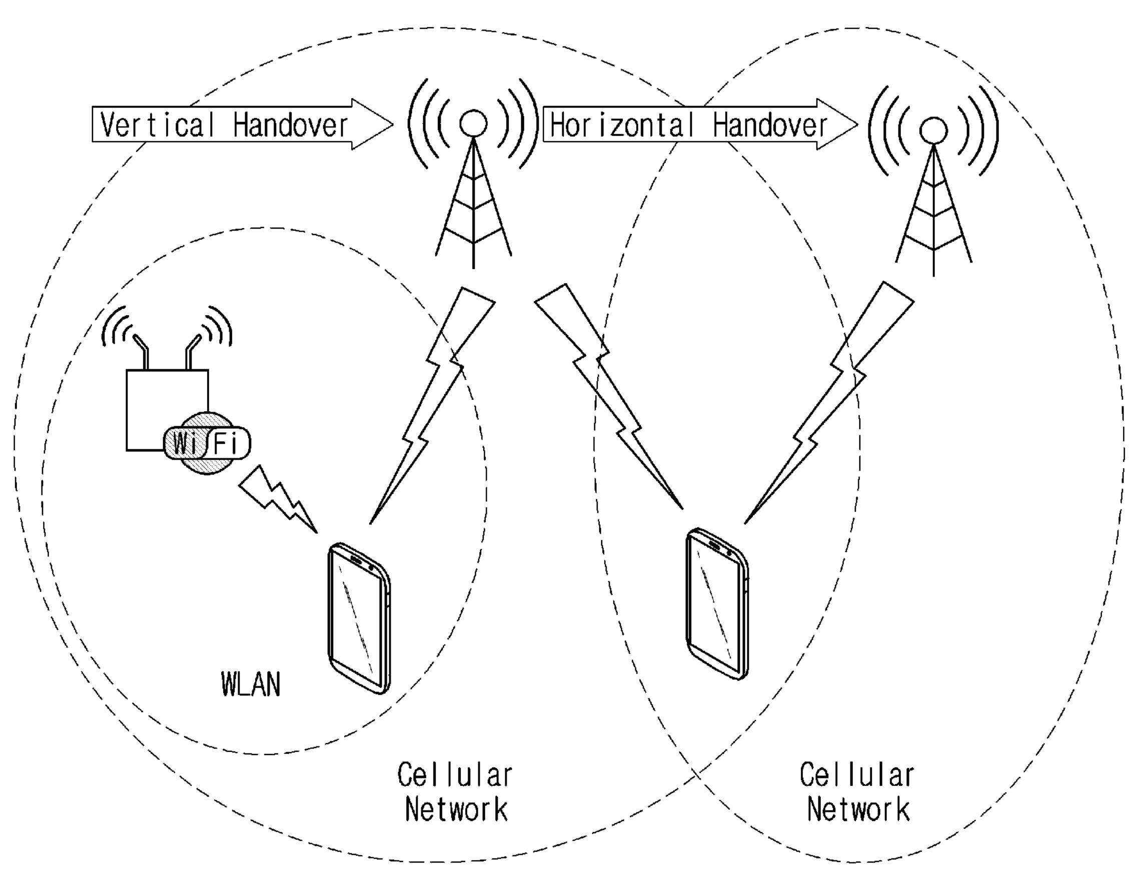
FIG. 18 is a diagram illustrating handover between a wireless local area network (WLAN) and a base station.

FIG. 18 is a diagram illustrating handover between a wireless local area network (WLAN) and a base station. The WLAN may be used interchangeably with Wi-Fi. A base station may be used interchangeably with terms such as a network and a cellular network. Referring to FIG. 18, a terminal may perform handover from a WLAN to a base station. For example, the terminal may perform vertical handover from a WLAN to a serving base station. Also, the terminal may perform handover from a base station to a base station. For example, the terminal may perform horizontal handover from a serving base station to a target base station.

If the terminal cannot perform seamless handover between Wi-Fi and a base station when a situation or environment changes, a terminal's response may be delayed or temporarily stop. In this specification, a terminal may be used as a concept including a wireless device related to a robot, IoT, and the like.

In addition, when a radio situation or environment changes, it is necessary to determine when the terminal should perform handover or handoff in order for the terminal to receive a good service. That is, although the wireless communication standard has KPIs such as latency and reliability, tradeoff may occur, and thus appropriate responses may be required.

The terminal may communicate indoors or outdoors using Wi-Fi. However, the terminal may not be able to directly access a better base station due to environments such as many wireless devices and high-rise buildings. Here, many wireless devices may include other terminals, autonomous driving devices, IoT, and the like.

In addition, there may be many cases in which Wi-Fi is disconnected after the terminal maintains low throughput or packet loss at an unacceptable level in terms of QoS (Quality of Service).

In addition, since the terminal does not perform handover from a base station to Wi-Fi based on throughput, but performs handover based on a strong signal of an access point (AP), it may take a long time to access a good base station again.

In addition, since the terminal performs handover based on the signal strength of the AP, it may receive a service with low QoS. Also, since the terminal performs handover based on the signal strength of the AP, the terminal may frequently attempt access to the AP and the terminal may frequently attempt handover. Accordingly, power consumption of the terminal may increase.

In addition, when handover is determined according to signal strength of Wi-Fi, low throughput, or packet loss, many wireless devices related to robots or IoT may not receive efficient services. In addition, since the Wi-Fi system does not manage services based on QoS, handover may not occur even if there is a better base station or network. In addition, when the terminal performs handover while the AP does not have the QoS information of the terminal, the terminal searches for a strong Wi-Fi signal and accesses to the strong Wi-Fi again even if the QoS is low.

The present disclosure proposes a method of enabling a terminal to efficiently access a base station by using access information of other terminals. In addition, the present disclosure proposes a method of increasing efficiency of a high-quality communication service, resource management of a base station, and power consumption of a terminal.

In addition, the present disclosure proposes a method of enabling a terminal to maintain a current service or to receive a better service. Specifically, the present disclosure is to use artificial intelligence so that a terminal can perform handover from a service point of view. That is, a handover method between Wi-Fi of an AI-based terminal and a base station is proposed.

Figure 19:
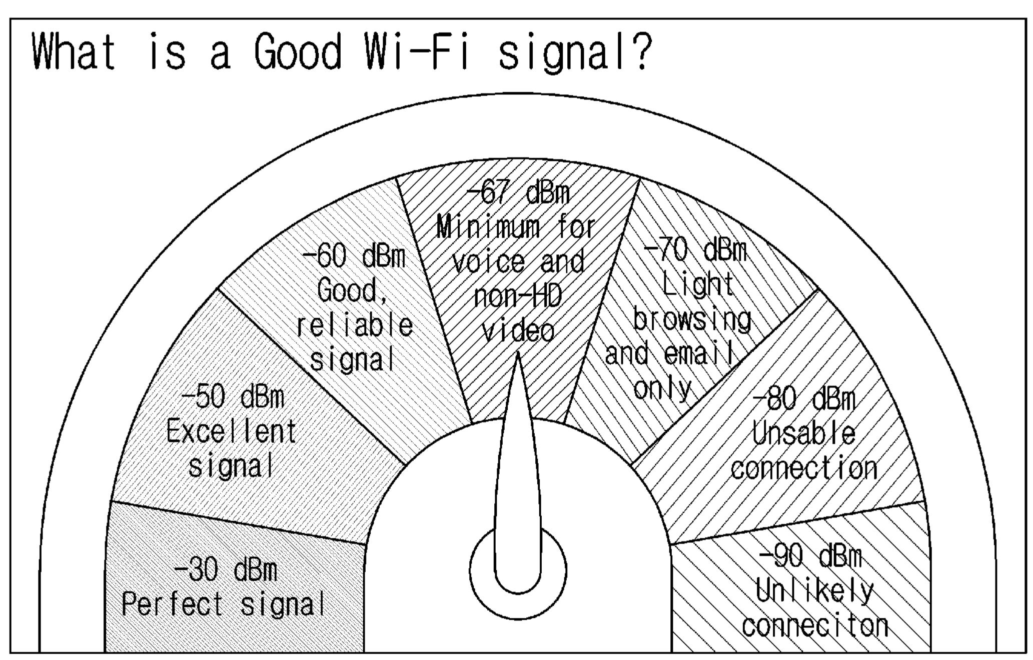
FIG. 19 is a diagram illustrating services according to Wi-Fi signal strength.

FIG. 19 is a diagram illustrating services according to Wi-Fi signal strength. Referring to FIG. 19, when the Wi-Fi signal is −30 dBm, it may be a perfect signal for enabling the terminal to perform communication. When the Wi-Fi signal is −50 dBm, it may be an excellent signal for enabling the terminal to perform communication. When the Wi-Fi signal is −60 dBm, it may be a stable signal (good or reliable signal) for enabling the terminal to perform communication. If the Wi-Fi signal is −67 dBm, it may be a minimum requirement for enabling the terminal to perform communication regarding voice and non-HD video. When the Wi-Fi signal is −70 dBm, it may be suitable when the terminal performs light browsing or writes an e-mail. If the Wi-Fi signal is −80 dBm, the connection of the terminal may be unstable. If the Wi-Fi signal is −90 dBm, the terminal may not be connected.

Figure 20:
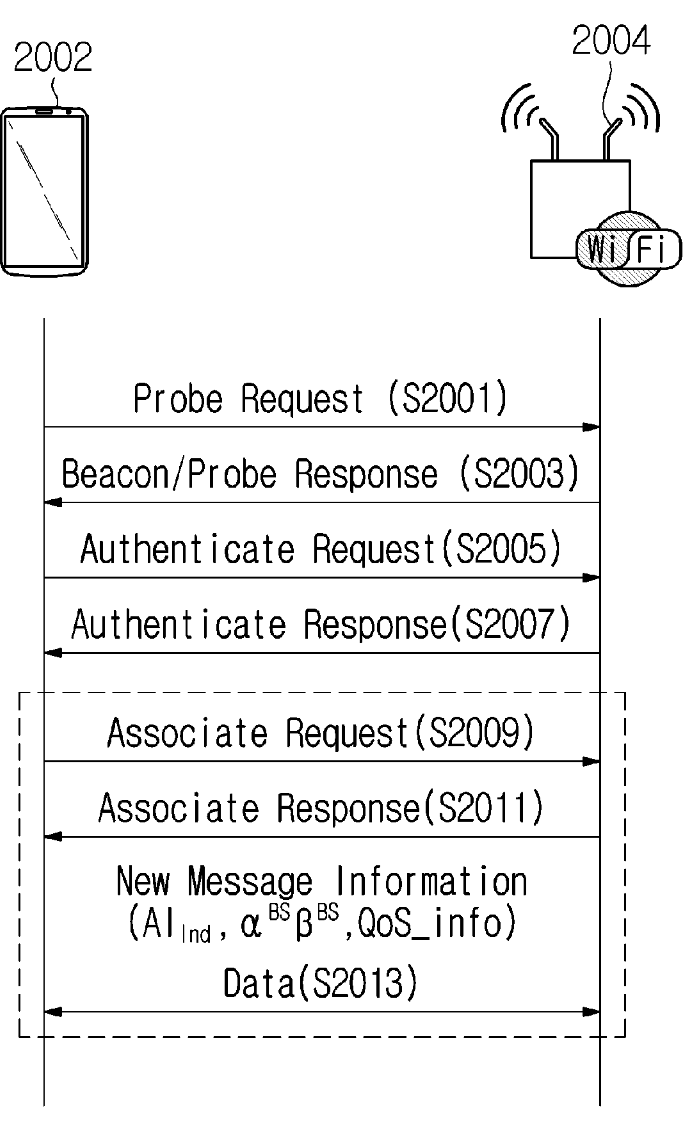
FIG. 20 is a diagram illustrating an example of an operation procedure of a terminal applicable to the present disclosure.

FIG. 20 is a diagram illustrating an example of an operation procedure of a terminal applicable to the present disclosure. Specifically, FIG. 20 illustrates a terminal 2002 receiving handover-related information from a server 2004 according to a service after the terminal 2002 is connected to Wi-Fi. The server may include an AP. Referring to FIG. 20, in step S2001, the terminal 2002 may transmit a probe request to the AP 2004. In step S2003, the terminal 2002 may receive a beacon/frame response from the AP 2004. In step S2005, the terminal may transmit an authenticate request to the AP. In step S2007, the terminal may receive an authenticate response from the AP. In step S2009, the terminal may transmit an associate request to the AP. In step S2011, the terminal may receive an associate response. The associate response may include new message information. The new message information may include $AI_{ind}$, $\alpha^{BS}$, $\beta^{BS}$, and QoS_info. Each information will be described later. This information may be information generated based on a result of federated learning of several terminals. That is, the terminal may efficiently access the base station using access information of other terminals. In addition, the terminal may receive handover-related information from the AP after connecting to the AP. The handover-related information received by the terminal from the AP may be a result of federated learning of several terminals. In step S2013, the terminal may exchange data with the AP.

Figure 21:
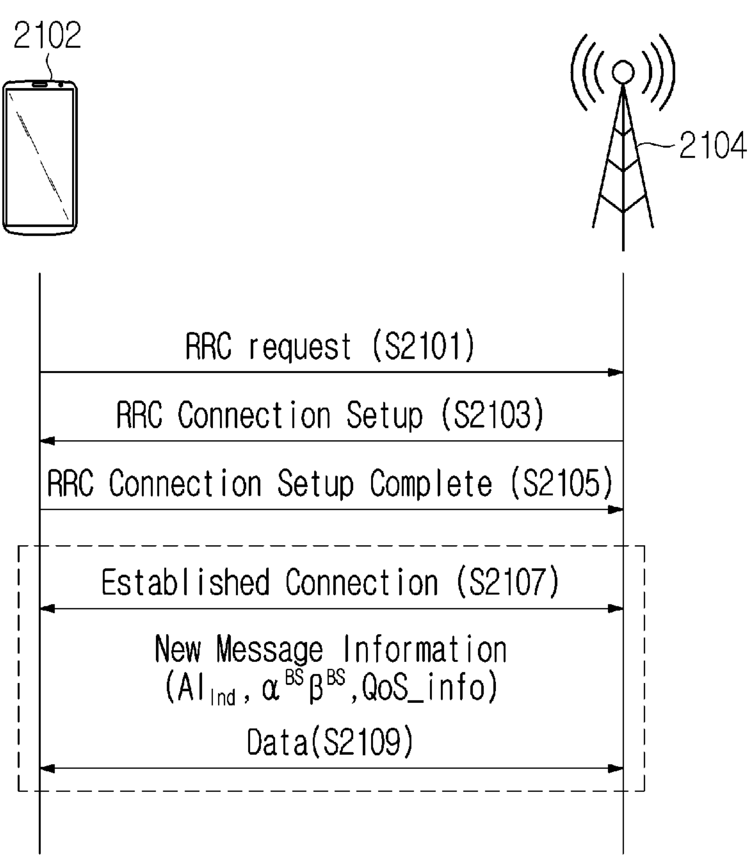
FIG. 21 is a diagram illustrating an example of an operation procedure of a terminal applicable to the present disclosure.

FIG. 21 is a diagram illustrating an example of an operation procedure of a terminal applicable to the present disclosure. The terminal may be connected to a server. The server may include a base station. Accordingly, the terminal may be connected to the base station. For example, the terminal 2102 may transmit a radio resource control request (RRC) request to the base station 2104 (S2101). The base station 2104 may transmit an RRC connection setup message to the terminal 2102 (S2103). The terminal 2102 may transmit an RRC Connection Setup Complete message to the base station 2104 (S2105). Accordingly, the terminal and the base station may be connected (S2107). After connecting to the base station, the terminal may receive a handover time point from the server. For example, after connecting to the base station, the terminal may receive new message information from the base station. The new message information may include $AI_{ind}$, $\alpha^{BS}$, $\beta^{BS}$, and QoS_info. The terminal and the base station may exchange data (S2109).

Figure 22:
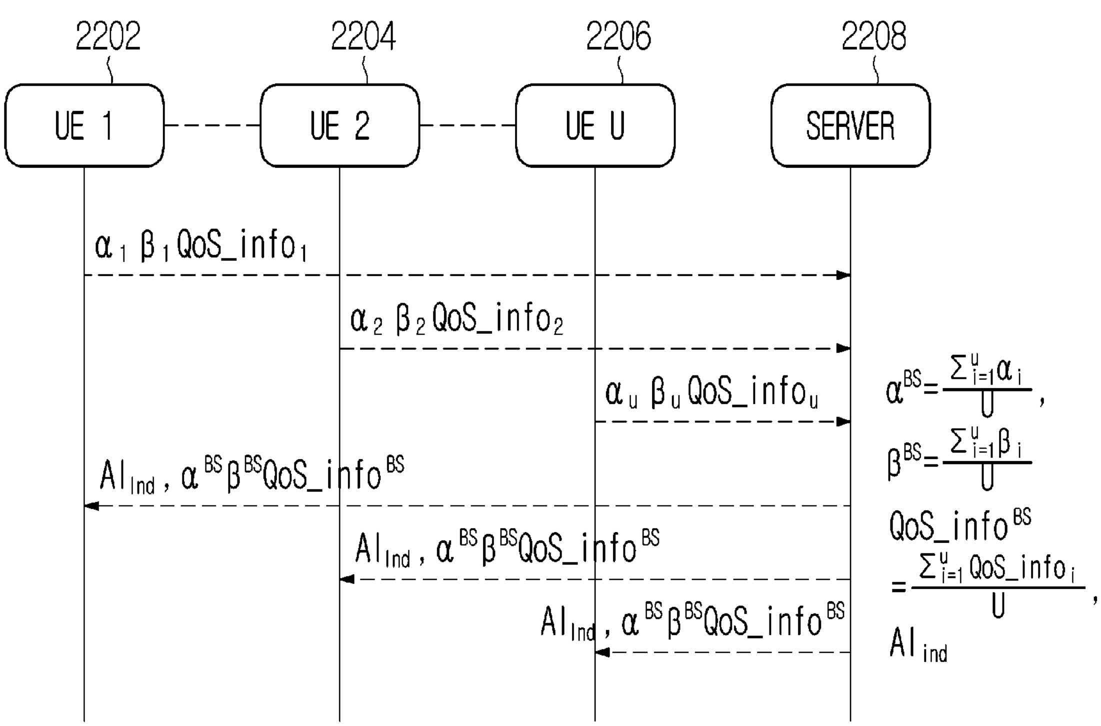
FIG. 22 is a diagram illustrating an example of federated learning applicable to the present disclosure.

FIG. 22 is a diagram illustrating an example of federated learning applicable to the present disclosure. FL (Federated Learning) is a machine learning technology in which multiple terminals or servers having local data samples and information train an algorithm without a terminal or server exchanging data samples and information. This method allows terminals to build a common powerful machine learning model without sharing data and information. Thus, federated learning technologies may address important issues such as data privacy, data security, data access rights, and heterogeneous data access. Federated learning may be performed in such a way that the terminal trains a local model for local data and information, the terminal sends parameters of the local model to the server so that the server may create a global model, and the terminal receives the global model from the server.

FIG. 22 is a diagram illustrating that a server receives parameter information from multiple terminals (UEs). A server may include an AP and a base station, and hereinafter, the terms AP, base station, and server may be used interchangeably.

A server 2208 may receive $\alpha_1$ and $\beta_1$ from UE 1 2202. Here, $\alpha_1$ and $\beta_1$ may mean parameters of a beta distribution. In addition, UE 1 2202 may generate parameters $\alpha_1$ and $\beta_1$ related to the handover learning model. For example, UE 1 may generate $\alpha_1$ and $\beta_1$ through an update based on parameter information related to the handover learning model received from the server. In addition, each terminal may also generate parameters related to the handover learning model based on the same method and transmit them to the server.

The server may receive $\alpha_2$ and $\beta_2$ from UE 2 2204. Also, the server 2208 may receive $\alpha_3$ and $\beta_3$ from UE 3. Similarly, the server 2208 may receive $\alpha_u$ and $\beta_u$ from UE U 2206. That is, the server 2208 may receive parameter information related to handover learning models of a plurality of UEs.

The server 2208 may receive $\text{QoS\_info}_1$ from UE 1 2202. $\text{QoS\_info}_1$—may mean QoS information related to UE 1. UE 1 2202 may generate QoS_info1, which is the parameter of the handover learning model. For example, UE 1 may generate $\text{QoS\_info}_1$ through an update based on the parameter information related to the handover learning model received from the server. Each UE may also generate service information based on the same method and transmit it to the server.

The server may generate $\alpha^{BS}$, $\beta^{BS}$, and $\text{QoS\_info}^{BS}$ based on information received from UEs. $\alpha^{BS}$, $\beta^{BS}$, and $\text{QoS\_info}^{BS}$ are shown in Equation 1.

$$\alpha^{BS} = \frac{\sum_{i=1}^{U} \alpha_i}{U} \quad \beta^{BS} = \frac{\sum_{i=1}^{U} \beta_i}{U} \qquad \text{Equation 1}$$

$$\text{QoS\_info}^{BS} = \frac{\sum_{i=1}^{U} \text{QoS\_info}_i}{U}$$

Here, U may mean the number of UEs that have provided handover-related parameter information. $\alpha^{BS}$ may mean an average of $\alpha$ of UEs received by the server. $\beta^{BS}$ may mean an average of $\beta$s of UEs received by the server. $\text{QoS\_info}^{BS}$ may mean an average of QoS_info of UEs received by the server.

The server may broadcast the generated $\alpha^{BS}$, $\beta^{BS}$ and $\text{QoS\_}^{infoBS}$ to UEs. In addition, the server may broadcast Mho, which is information indicating whether the reception terminal uses the learning model, to UEs.

FIG. 23 is a diagram illustrating an example of an operation procedure of a terminal applicable to the present disclosure. Specifically, FIG. 23 is a diagram illustrating an example of an operation procedure in which a terminal performs federated learning and Thompson sampling. Here, the server may include an access point (AP), a base station, and a 5G non-public network (NPN). An NPN may be operated by an NPN operator and may depend on network functions provided by a Public Land Mobile Network (PLMN).

In step S2301, the terminal may be connected to the server (AP). That is, the terminal may be connected to WI-FI. In step S2303, the server may transmit a global model to the terminal. For example, the AP may transmit the global model to the terminal. The global model may include handover-related information based on access information of a plurality of terminals. For example, the global model may include $\alpha^{BS}$, $\beta^{BS}$, and $\text{QoS\_}^{infoBS}$ of Equation 1 above. Also, the global model may include Mind.

In step S2305, the terminal may update a local model based on QoS. For example, the terminal may update the local model based on the global model received from the server. Specifically, the terminal may update a beta distribution based on its own QoS.

In step S2307, the terminal may select a maximum value from among randomly sampled values of the beta distribution based on QoS. Specifically, the terminal may randomly sample the beta distribution related to a handover time point based on QoS. The terminal may add a bias value among the randomly sampled values of the beta distribution. Here, the terminal may select and add the lowest bias value. That is, the terminal may give a weight to the time to perform handover. The terminal may select a maximum value from among values obtained by adding a bias to the randomly sampled value of the beta distribution. In this specification, the maximum value may be expressed as best_rx.

In step S2309, the terminal may check receive power and perform handover at the best_rx time point. For example, the terminal may perform vertical handover. For example, the terminal may perform handover from the AP to the base station. As another example, the terminal may perform handover from the AP to the NPN. In step S2311, the terminal may perform $\alpha$+1 operation when the service (QoS) is maintained or improved for a certain period of time after handover, and perform $\beta$+1 operation when the service is decreased. In step S2313, the terminal may update the beta distribution, which is a local model of each service (QoS). That is, the terminal may update the beta distribution based on the service. In step S2315, the terminal may transmit the local model to the server. That is, the terminal may transmit updated beta distribution parameter information to the server. In step S2317, the server (AP) may update the global model through the local model received from the terminal.

Figure 24:
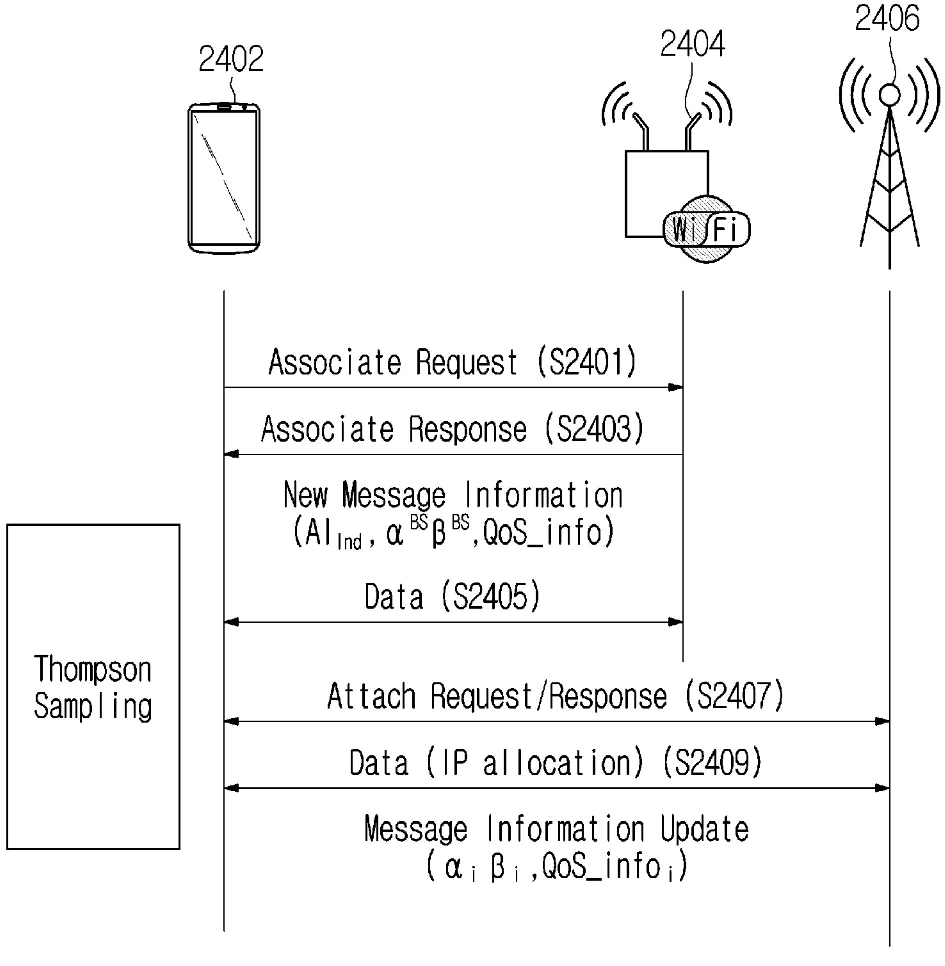
FIG. 24 is a diagram illustrating an example of a handover operation procedure applicable to the present disclosure.

FIG. 24 is a diagram illustrating an example of a handover operation procedure applicable to the present disclosure. In step S2401, a terminal 2402 may transmit an associate request message to an AP 2404. For example, the terminal 2402 may request new message information from the AP 2404. The new message information may include $AI_{ind}$, $\alpha^{BS}$, $\beta^{BS}$ and QoS_info. In step S2403, the AP 2404 may transmit an associate response message to the terminal 2402. For example, the AP may transmit the new message information to the terminal. The terminal may receive the new message information and perform Thompson sampling. Thompson sampling may select the largest value from among sampled values by applying accumulated $\alpha$ and $\beta$ to the beta distribution. The following shows an equation related to Thompson sampling.

$$\text{Beta}(x|a, b) = \frac{1}{B(a, b)} x^{a-1}(1-x)^{b-1}, \qquad \text{Equation 2}$$

$$B(a, b) = \int_0^1 x^{a-1}(1-x)^{b-1}dx$$

The accumulated $\alpha$ and $\beta$ values received by the terminal may be values to which the QoS of the corresponding terminal is not applied. The terminal may apply and infer its own QoS to create new $\alpha$ and $\beta$ values and update them to new Beta($\alpha$, $\beta$). The terminal may perform random sampling based on this updated information and select a maximum value from among the values. Here, the terminal may add a bias value to the sampling value. For example, the terminal may add a bias value by selecting a lower value among sampling values. In addition, the terminal may select a maximum value from among values obtained by adding a bias value to a sampling value. The terminal may perform handover based on the selected maximum value. In step S2405, the terminal and the AP may exchange data.

The terminal may check receive power and perform handover based on the selected maximum value. For example, the terminal may check the receive power and perform handover to the base station based on the selected maximum value. In step S2407, the terminal may transmit an attach request message to the base station and receive an attach response message from the base station. In step S2409, the terminal and the base station may exchange data. The terminal may update message information. That is, the terminal may update α, β and QoS_info. The terminal may transmit the updated beta distribution parameter and QoS information to the base station.

Figure 25:
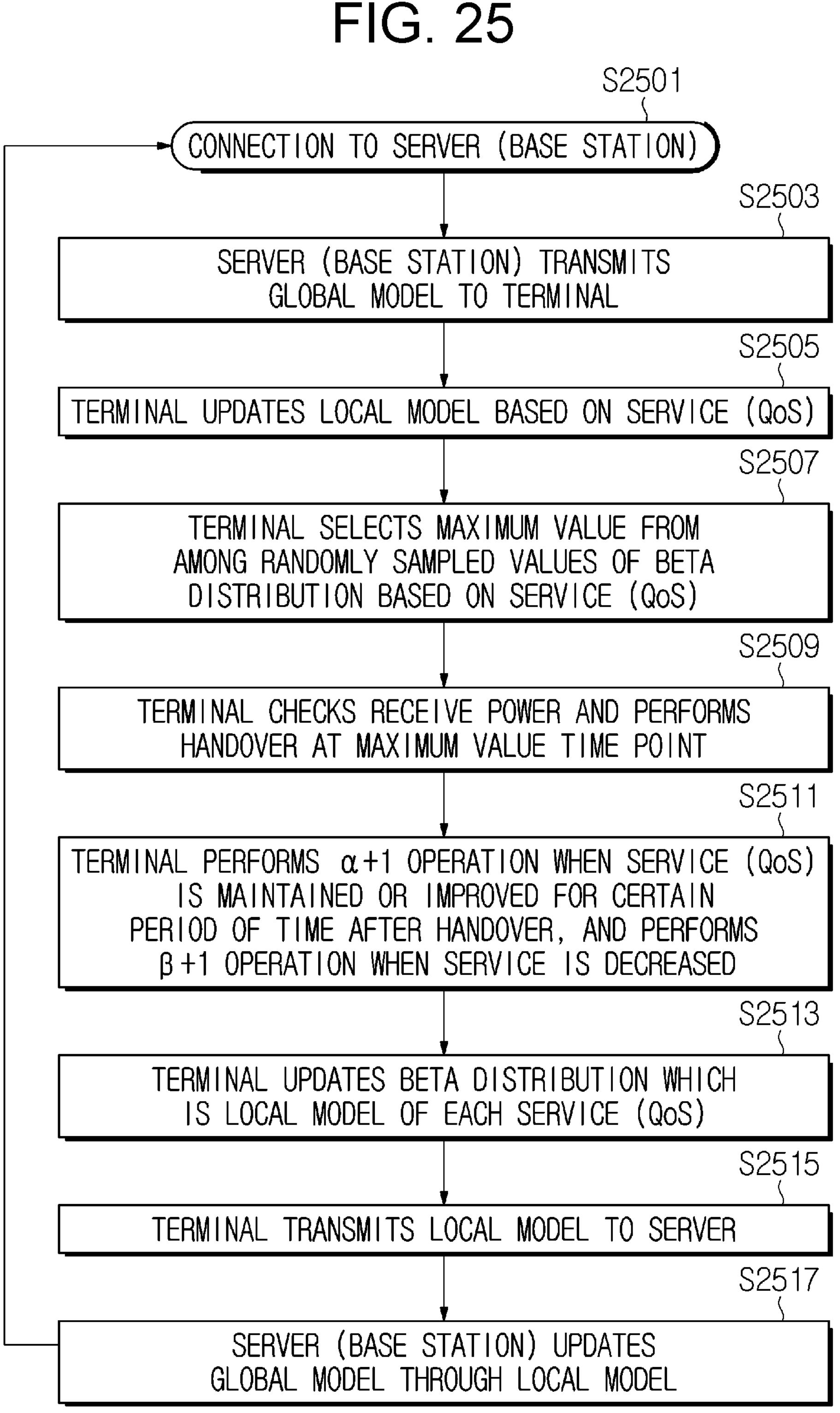
FIG. 25 is a diagram illustrating an example of an operation procedure of a terminal applicable to the present disclosure.

FIG. 25 is a diagram illustrating an example of an operation procedure of a terminal applicable to the present disclosure. Specifically, FIG. 25 is a diagram illustrating an example of an operation procedure in which a terminal performs federated learning and Thompson sampling. Here, a server may include an access point (AP), a base station, and a 5G non-public network (NPN). An NPN may be operated by an NPN operator and may depend on network functions provided by a Public Land Mobile Network (PLMN).

In step S2501, the terminal may be connected to the server. For example, a terminal may be connected to a base station. That is, the terminal may be connected to a cellular network. In step S2503, the server may transmit a global model to the terminal. For example, the base station may transmit the global model to the terminal. The global model may include handover related information based on access information of a plurality of terminals. For example, the global model may include $\alpha^{BS}$, $\beta^{BS}$, and QoS_info$^{BS}$ of Equation 1 above. Also, the global model may include $AI_{ind}$.

In step S2505, the terminal may update a local model based on QoS. For example, the terminal may update the local model based on the global model received from the server. Specifically, the terminal may update the beta distribution based on its own QoS.

In step S2507, the terminal may select a maximum value from among randomly sampled values of a beta distribution based on QoS. Specifically, the terminal may randomly sample the beta distribution related to a handover time point based on QoS. The terminal may add a bias value among the randomly sampled values of the beta distribution. Here, the terminal may select and add the lowest bias value. That is, the terminal may give a weight to the time to perform handover. The terminal may select a maximum value from among values obtained by adding a bias to the randomly sampled values of the beta distribution. In this specification, the maximum value may be expressed as best_rx.

In step S2509, the terminal may check receive power and perform handover at the maximum value best_rx time point. For example, the terminal may perform vertical handover. For example, the terminal may perform handover from the base station to the AP. As another example, the terminal may perform handover from the base station to the NPN. In step S2511, the terminal may perform α+1 operation when the service (QoS) is maintained or improved for a certain period of time after handover and perform a β+1 operation when the service is decreased. In step S2513, the terminal may update the beta distribution, which is a local model of each service (QoS). That is, the terminal may update the beta distribution based on the service. In step S2515, the terminal may transmit the local model to the server. That is, the terminal may transmit the updated beta distribution parameter information to the server. In step S2517, the base station may update the global model through the local model received from the terminal.

Figure 26:
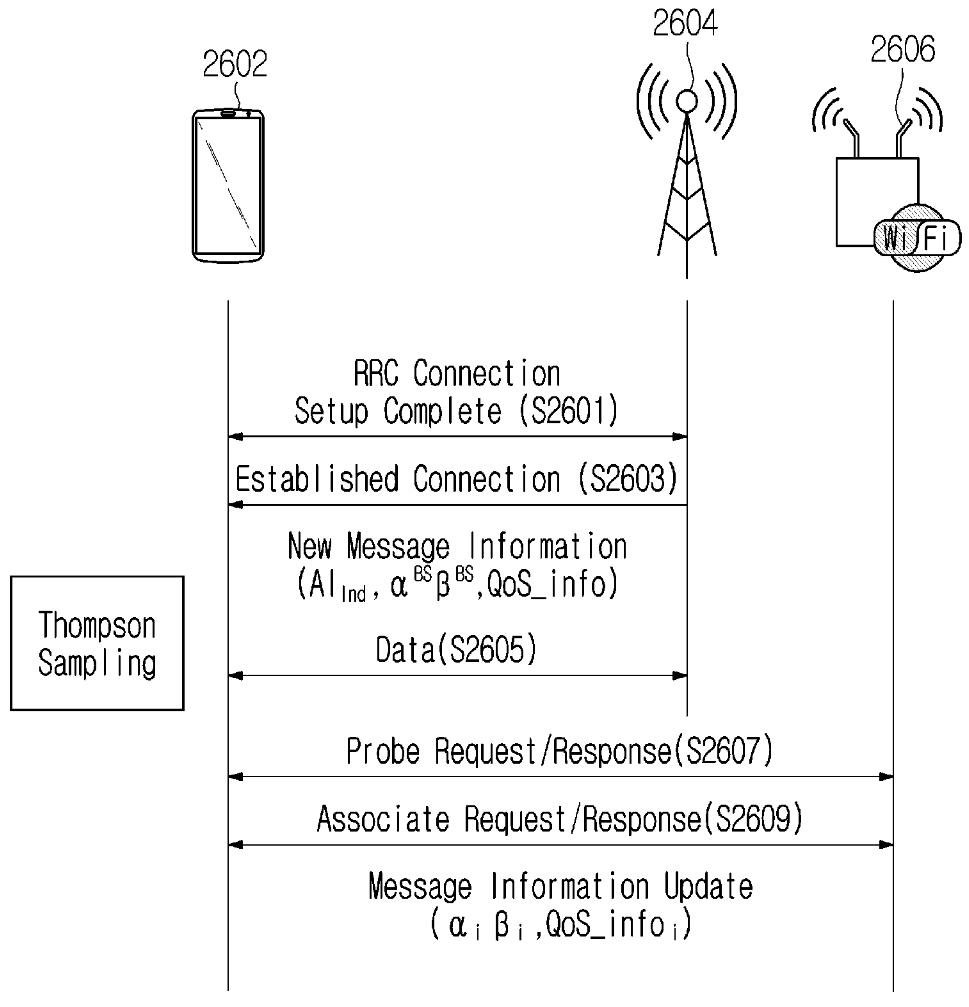
FIG. 26 is a diagram illustrating an example of an operation procedure of a terminal applicable to the present disclosure.

FIG. 26 is a diagram illustrating an example of an operation procedure of a terminal applicable to the present disclosure. In step S2601, a terminal 2602 and a base station 2604 may perform an RRC connection. In step S2603, connection between the terminal 2602 and the base station 2604 may be completed. The terminal may receive new message information from the base station. The new message information may include $AI_{ind}$, $\alpha^{BS}$, $\beta^{BS}$m and QoS-_info. The terminal may receive the new message information and perform Thompson sampling. Thompson sampling may select the largest value among sampled values by applying the accumulated α and β to the beta distribution. Thompson sampling may be expressed according to Equation 2 above.

The accumulated α and β values received by the terminal may be values to which the QoS of the corresponding terminal is not applied. The terminal may apply and infer its own QoS to create new α and β values and update them to new Beta(α, β). The terminal may randomly sample based on this updated information and select a maximum value from among the values. Here, the terminal may add a bias value to the sampled value. For example, the terminal may add a bias value by selecting a lower value among sampling values. In addition, the terminal may select a maximum value from among values obtained by adding a bias value to a sampling value. The terminal may perform handover based on the selected maximum value. In step S2605, the terminal and the base station may exchange data. The terminal may check receive power and perform handover based on the selected maximum value. For example, the terminal may perform handover from the base station to the AP. The terminal may perform handover from the base station to the AP based on QoS.

In step S2607, the terminal may transmit a probe request message to the AP and receive a probe response message from the AP. In step S2409, the terminal and the AP may exchange data. The terminal may update message information. That is, the terminal may update a, 13 and QoS_info. The terminal may transmit the updated beta distribution parameter and QoS information to the AP.

Figure 27:
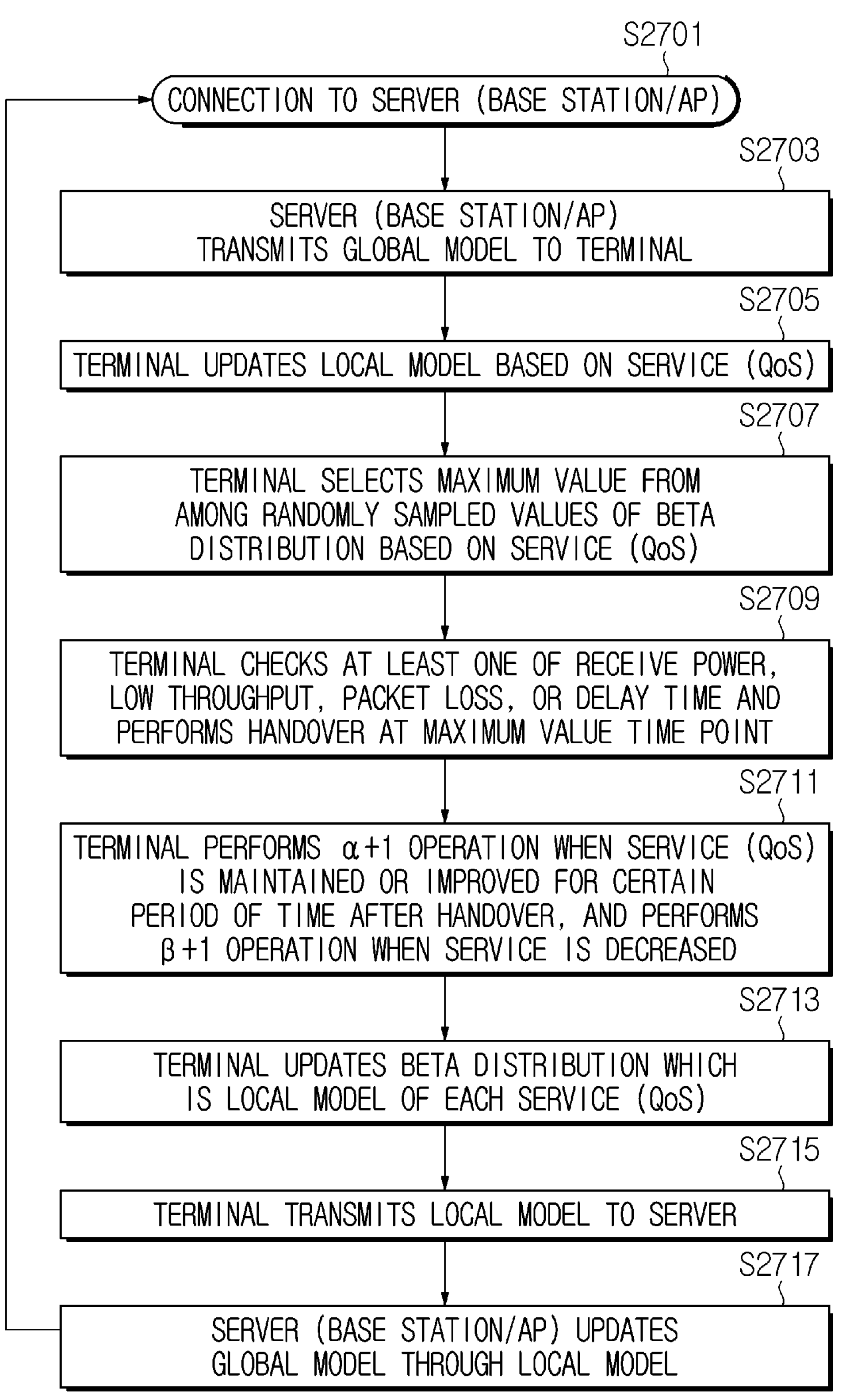
FIG. 27 is a diagram illustrating an example of an operation procedure of a terminal applicable to the present disclosure.

FIG. 27 is a diagram illustrating an example of an operation procedure of a terminal applicable to the present disclosure. Specifically, FIG. 27 is a diagram illustrating an example of an operation procedure in which a terminal performs federated learning and Thompson sampling. Here, the server may include an access point (AP), a base station, and a 5G non-public network (NPN). An NPN may be operated by an NPN operator and may depend on network functions provided by a Public Land Mobile Network (PLMN). The handover time point may be set based on low throughput, packet loss, delay time, and the like, as well as receive power of the terminal. Also, the handover time point may be set by a combination of the above factors.

In step S2701, the terminal may be connected to the server. In step S2703, the server may transmit a global model to the terminal. For example, the server may transmit the global model to the terminal. The global model may include handover-related information based on access information of a plurality of terminals. For example, the global model may include $\alpha^{BS}$, $\beta^{BS}$, QoS_info$^{BS}$ of Equation 1 above. Also, the global model may include $AI_{ind}$.

In step S2705, the terminal may update a local model based on QoS. For example, the terminal may update the local model based on the global model received from the server. Specifically, the terminal may update the beta distribution based on its own QoS.

In step S2707, the terminal may select a maximum value from among randomly sampled values of the beta distribution based on QoS. Specifically, the terminal may randomly sample the beta distribution related to a handover time point based on QoS. The terminal may add a bias value among the randomly sampled values of the beta distribution. Here, the terminal may select and add the lowest bias value. That is, the terminal may give a weight to the time to perform handover. The terminal may select a maximum value from among values obtained by adding a bias to the randomly sampled value of the beta distribution.

In step S2709, the terminal may check at least one of receive power, low throughput, packet loss, or delay time, and perform handover at the maximum value best_rx time point. For example, the terminal may perform vertical handover. For example, the terminal may perform handover from the base station to the AP. As another example, the terminal may perform handover from the AP to the base station. As another example, the terminal may perform handover from the base station to the NPN. As another example, the terminal may perform handover from the NPN to the base station. As another example, the terminal may perform handover from the NPN to the AP. As another example, the terminal may perform handover from the AP to the NPN. In addition, the terminal may also perform horizontal handover.

In step S2711, the terminal may perform $\alpha$+1 operation when the service (QoS) is maintained or improved for a certain period of time after handover and perform $\beta$+1 operation when the service is decreased. In step S2713, the terminal may update a beta distribution, which is a local model of each service (QoS). That is, the terminal may update the beta distribution based on the service. In step S2715, the terminal may transmit the local model to the server. That is, the terminal may transmit the updated beta distribution parameter information to the server. In step S2717, the server may update the global model through the local model received from the terminal.

Figure 28:
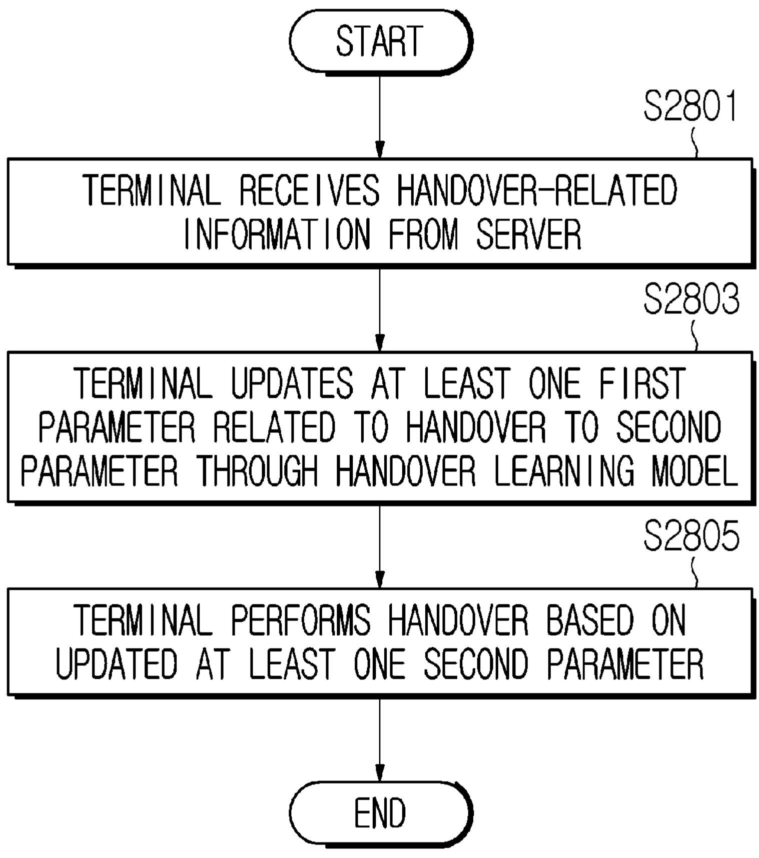
FIG. 28 is a diagram illustrating an example of an operation procedure of a terminal applicable to the present disclosure.

FIG. 28 is a diagram illustrating an example of an operation procedure of a terminal applicable to the present disclosure. In step S2801, the terminal may receive handover-related information from a server. The server may include an AP or a base station. Here, the handover-related information may include at least one first parameter for a handover learning model and QoS information. For example, the handover-related information may include new message information. The new message information may include $AI_{in}d$, $\alpha^{BS}$, $\beta^{BS}$, and QoS_info.

$AI_{Ind}$ may mean information indicating whether the terminal uses the learning model. For example, the terminal may select whether to use the handover learning model based on the $AI_{Ind}$ value. In addition, the terminal may perform handover without using a handover learning model based on the $AI_{Ind}$ value.

Thompson sampling may select the largest value from among sampled values by applying the accumulated $\alpha$ and $\beta$ to the beta distribution. Thompson sampling may be expressed according to Equation 2 above. $\alpha^{BS}$ and $\beta^{BS}$ may be parameters generated by the server based on access information of a plurality of terminals. This may be expressed as in Equation 1 above. QoS_info—may refer to information about multiple terminals accessing the server based on QoS.

In step S2803, the terminal may update at least one first parameter related to handover to a second parameter through the handover learning model. For example, the accumulated $\alpha$ and $\beta$ values received by the terminal may be values to which the QoS of the corresponding terminal is not applied. The terminal may apply and infer its own QoS to create new $\alpha$ and $\beta$ values and update them to new Beta($\alpha$, $\beta$). The terminal may perform random sampling based on this updated information and select a maximum value from among the values. Here, the terminal may add a bias value to the sampled value. For example, the terminal may add a bias value by selecting a lower value from among sampling values. In addition, the terminal may select a maximum value from among values obtained by adding a bias value to a sampling value.

In step S2805, the terminal may perform handover based on the updated at least one second parameter. For example, the terminal may perform handover based on the selected maximum value. That is, the terminal may perform vertical handover based on QoS. In addition, the terminal may perform handover from the base station to the AP based on QoS. In addition, the terminal may perform handover from the AP to the base station based on QoS. As another example, the terminal may perform horizontal handover based on QoS.

In addition, the terminal may check at least one of receive power, low throughput, packet loss or delay time, and perform handover at a time point based on the selected maximum value. The terminal may perform $\alpha$+1 operation when the service (QoS) is maintained or improved for a certain period of time after handover and perform a $\beta$+1 operation when the service is decreased. The terminal may update the beta distribution of each QoS. The terminal may transmit the updated second parameter information to the server.

Figure 29:
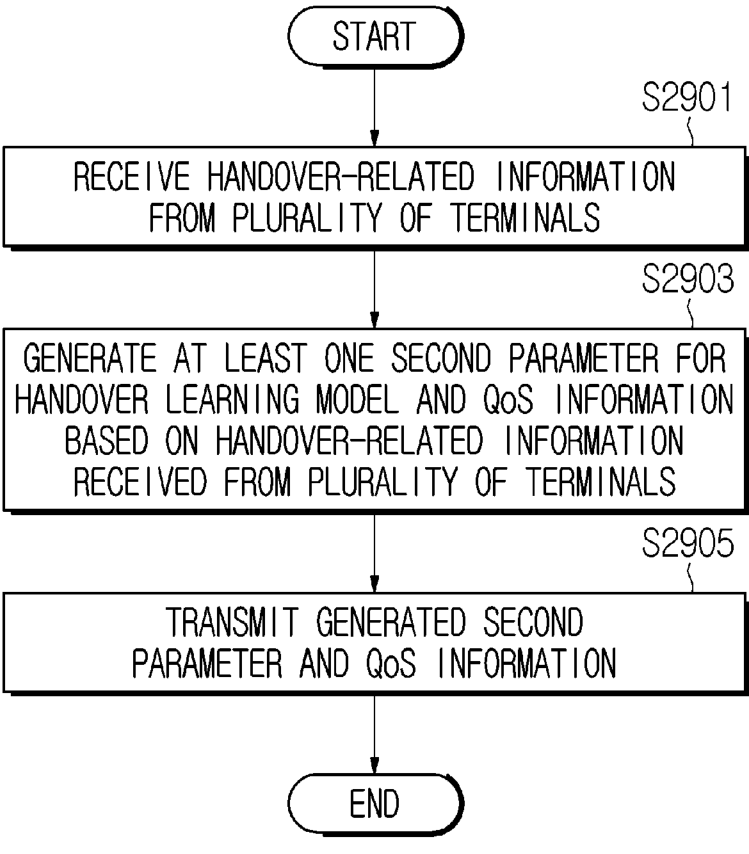
FIG. 29 is a diagram illustrating an example of an operation procedure of a base station applicable to the present disclosure.

FIG. 29 is a diagram illustrating an example of an operation procedure of a base station applicable to the present disclosure. Federated learning may be performed in such a way that the terminal trains a local model for local data and information, the terminal sends parameters of the local model to a server so that the server may create a global model, and the terminal receives a global model from the server. Accordingly, the base station may perform federated learning by receiving and updating handover-related information of each terminal from multiple terminals. APs and non-base stations may also perform the operation procedures of FIG. 29.

In step S2901, the base station may receive handover-related information of each terminal from a plurality of terminals. The handover-related information may include at least one first parameter for a handover learning model and quality of service (QoS) information. For example, the handover-related information may include $\alpha$, $\beta$, and QoS_info of each terminal. $\alpha$ and $\beta$ may be beta distribution parameters, as described above. Here, $\alpha$ and $\beta$ may be first parameters for the handover learning model and may mean a local model of each terminal. QoS information may mean service information of each terminal.

In step S2903, the base station may generate at least one second parameter for the handover learning model and QoS information based on handover-related information received from a plurality of terminals. For example, the base station may generate new message information based on handover-related information received from a plurality of terminals. The new message information may include $AI_{ind}$, $\alpha^{BS}$, $\beta^{BS}$, and QoS_info. Each new message information is as described above. Here, the second parameter may mean $\alpha^{BS}$ and $\beta^{BS}$, as described above. Also, QoS_info may mean QoS information generated by the base station based on federated learning.

In step S2905, the base station may transmit the generated second parameter and QoS information to the terminal. The base station may transmit the second parameter and QoS information generated as handover-related information to the terminal. In addition, the base station may include $AI_{ind}$ in handover-related information and transmit it. The base station may indicate whether the terminal uses the handover learning model based on $AI_{ind}$.

As the examples of the proposal method described above may also be included in one of the implementation methods of the present disclosure, it is an obvious fact that they may be considered as a type of proposal methods. In addition, the proposal methods described above may be implemented individually or in a combination (or merger) of some of them. A rule may be defined so that information on whether or not to apply the proposal methods (or information on the rules of the proposal methods) is notified from a base station to a terminal through a predefined signal (e.g., a physical layer signal or an upper layer signal).

The present disclosure may be embodied in other specific forms without departing from the technical ideas and essential features described in the present disclosure. Therefore, the above detailed description should not be construed as limiting in all respects and should be considered illustrative. The scope of the present disclosure should be determined by rational interpretation of the appended claims, and all changes within the equivalent scope of the present disclosure are included in the scope of the present disclosure. In addition, claims having no explicit citation relationship in the claims may be combined to form an embodiment or to be included as a new claim by amendment after filing.

The embodiments of the present disclosure are applicable to various radio access systems. Examples of the various radio access systems include a 3rd generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

The invention claimed is:

1. A method of operating a terminal in a wireless communication system, the method comprising:

receiving first information from an access point (AP), the first information including at least one first parameter;

performing handover to a base station based on at least one second parameter; and performing communication through the base station, wherein the first information further includes quality of service (QoS) information, wherein the at least one first parameter is updated to the at least one second parameter through a handover learning model based on the QoS information, wherein the handover learning model is a model trained based on a beta distribution, and wherein the terminal performs handover based on a randomly sampled value of the beta distribution and adding a bias value to the randomly sampled value.

2. The method of claim 1, wherein the performing handover comprises changing a connection from the AP to the base station.

3. The method of claim 1, further comprising transmitting the at least one second parameter to a base station.

4. The method of claim 1, wherein the first information further includes information indicating whether the terminal uses the handover learning model.

5. The method of claim 1, wherein the bias value is a value for selecting a lower value from among sampled values, and wherein a maximum value is selected from among values obtained by adding the bias value to the sampled value.

6. The method of claim 5, wherein the terminal checks receive power and performs handover based on the maximum value.

7. A terminal in a wireless communication system, the terminal comprising:

a transceiver; and a processor connected to the transceiver, wherein the processor is configured to:

control the transceiver to receive first information from an access point (AP), the first information including at least one first parameter, perform handover to a base station based on at least one second parameter, and perform communication through the base station, wherein the first information further includes quality of service (QoS) information, wherein the at least one first parameter is updated to the at least one second parameter through a handover learning model based on the QoS information, wherein the handover learning model is a model trained based on a beta distribution, and wherein the terminal performs handover based on a randomly sampled value of the beta distribution and adding a bias value to the randomly sampled value.

8. The terminal of claim 7, wherein the processor is configured to change a connection from the AP to the base station through the handover.

9. The terminal of claim 7, wherein the processor is further configured to control the transceiver to transmit the at least one second parameter to the base station.

10. The terminal of claim 7, wherein the first information further includes information indicating whether the terminal uses the handover learning model.

11. The terminal of claim 7, wherein the bias value is a value for selecting a lower value from among sampled values, and wherein a maximum value is selected from among values obtained by the bias value to the sampled value.

12. The terminal of claim 11, wherein the processor is configured to check receive power and performs handover based on the maximum value.

13. A base station in a wireless communication system, the base station comprising:

a transceiver; and a processor connected to the transceiver, wherein the processor is configured to:

control the transceiver to receive handover-related information from a plurality of terminals, the handover-related information including at least one first parameter for a handover learning model and quality of service (QoS) information, generate at least one second parameter for a handover learning model and QoS information based on the handover-related information received from the plurality of terminals, and control the transceiver to transmit the generated at least one second parameter and QoS information to a first terminal, wherein the handover learning model is a model trained based on a beta distribution, and wherein the first terminal performs handover based on a randomly sampled value of the beta distribution and adding a bias value to the randomly sampled value.

14. The base station of claim 13, wherein the handover-related information further includes information indicating whether a terminal uses the handover learning model.

15. The base station of claim 13, wherein the first terminal performs handover from an access point (AP) to the base station based on the second parameter.

* * * * *